US011133905B2

(12) United States Patent
Xu et al.

(10) Patent No.: US 11,133,905 B2
(45) Date of Patent: Sep. 28, 2021

(54) APPARATUS AND METHOD IN WIRELESS COMMUNICATION SYSTEM

(71) Applicant: Sony Corporation, Tokyo (JP)

(72) Inventors: Jin Xu, Beijing (CN); Dongru Li, Beijing (CN); Hang Yang, Beijing (CN); Chaonan He, Beijing (CN); Xiaofeng Tao, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 123 days.

(21) Appl. No.: 16/491,575

(22) PCT Filed: Jun. 6, 2018

(86) PCT No.: PCT/CN2018/090072
§ 371 (c)(1),
(2) Date: Sep. 6, 2019

(87) PCT Pub. No.: WO2018/223982
PCT Pub. Date: Dec. 13, 2018

(65) Prior Publication Data
US 2021/0135809 A1 May 6, 2021

(30) Foreign Application Priority Data
Jun. 9, 2017 (CN) .......................... 201710433713.0

(51) Int. Cl.
H04W 72/08 (2009.01)
H04L 5/00 (2006.01)
(Continued)

(52) U.S. Cl.
CPC ......... H04L 5/0048 (2013.01); H04B 7/0626 (2013.01); H04B 7/0802 (2013.01);
(Continued)

(58) Field of Classification Search
CPC ....... H04L 16/14; H04L 5/001; H04L 5/0053; H04W 16/14; H04W 4/70; H04W 72/0413; H04W 72/042; H04W 72/0453
See application file for complete search history.

(56) References Cited

U.S. PATENT DOCUMENTS

2017/0208494 A1* 7/2017 Moon .................... H04L 5/0048
2017/0251460 A1* 8/2017 Agiwal ............. H04W 72/0406
(Continued)

FOREIGN PATENT DOCUMENTS

CN 103843386 A 6/2014

OTHER PUBLICATIONS

Guangdong Oppo Mobile Telecom: "CSI-RS design for beam management", 3GPP Draft; R1-1707700, 3rd Generation Partnership Project (3GPP), vol. RAN WG1, May 15, 2017-May 19, 2017 May 14, 2017 (May 14, 2017), XP051272906, Retrieved from the Internet: URL:http://www.3gpp.org/ftp/Meetings_3GPP_SYNC/RAN1/Docs/ [retrieved on May 14, 2017].
(Continued)

Primary Examiner — Chi Ho A Lee
Assistant Examiner — Andrew Lee
(74) Attorney, Agent, or Firm — Xsensus LLP

(57) ABSTRACT

An apparatus and a method in a wireless communication system are disclosed. The apparatus comprises a processing circuit, the processing circuit being configured to: determine an idle resource element in a P2 process and/or a P3 process based on a channel state information-reference signal (CSI-RS) mapping structure, wherein only a transmission beam is scanned in the P2 process, only a reception beam is scanned in the P3 process, and the idle resource element refers to a resource element which is not occupied by a CSI-RS in an OFDM symbol occupied by the CSI-RS; and when the P2 process and/or the P3 process is carried out, control a base station so that same uses the idle resource element to send data and/or control information to a user equipment.

19 Claims, 16 Drawing Sheets

(51) Int. Cl.
  *H04B 7/06* (2006.01)
  *H04B 7/08* (2006.01)
  *H04W 72/04* (2009.01)
(52) U.S. Cl.
  CPC ............ *H04L 5/001* (2013.01); *H04W 72/042* (2013.01); *H04W 72/085* (2013.01); *H04W 72/044* (2013.01)

(56) References Cited

U.S. PATENT DOCUMENTS

| | | | | |
|---|---|---|---|---|
| 2017/0373740 | A1* | 12/2017 | Guo | H04L 5/0028 |
| 2018/0091992 | A1* | 3/2018 | Frenne | H04B 7/0626 |
| 2018/0351629 | A1* | 12/2018 | Nilsson | H04B 7/0695 |
| 2019/0253116 | A1* | 8/2019 | Priyanto | H04W 74/0833 |
| 2019/0334604 | A1* | 10/2019 | Kusano | H01Q 3/26 |
| 2019/0349054 | A1* | 11/2019 | Xiang | H04W 28/18 |
| 2020/0021413 | A1* | 1/2020 | Park | H04L 5/0026 |
| 2020/0067590 | A1* | 2/2020 | Wang | H04B 7/0632 |
| 2020/0068644 | A1* | 2/2020 | Zhou | H04W 72/046 |
| 2020/0177256 | A1* | 6/2020 | Cha | H04L 5/0094 |

OTHER PUBLICATIONS

Samsung: "CSI-RS for Beam Management", 3GPP Draft; R1-1707971 CSI-RS for BM, 3rd Generation Partnership Project (3GPP), France, vol. RAN WG1, May 15, 2017-May 19, 2017 May 14, 2017 (May 14, 2017), XP051273169, Retrieved from the Internet: URL:http://www.3gpp.org/ftp/Meetings_3GPP_SYNC/RAN1/Docs/ [retrieved on May 14, 2017].

Interdigital et al: "On CSI-RS Design for Beam Management", 3GPP Draft; R1-1708340 on CSI-RS Design for Beam Management, 3rd Generation Partnership Project (3GPP), vol. RAN WG1, May 15, 2017-May 19, 2017 May 14, 2017 (May 14, 2017), XP051273533, Retrieved from the Internet: URL:http://www.3gpp.org/ftp/Meetings_3GPP _SYNC/RAN1/Docs/ [retrieved on May 14, 2017].

Samsung: "CSI-RS for beam management", 3GPP Draft; R1-1705351 CSI-RS for BM V5, 3rd Generation Partnership Project (3GPP), vol. RAN WG1, Apr. 3, 2017-Apr. 7, 2017 Apr. 2, 2017 (Apr. 2, 2017), XP051 243481 , Retrieved from the Internet: URL:http://www.3gpp.org/ftp/Meetings_3GPP_SYNC/RAN1/Docs/ [retrieved on Apr. 2, 2017].

Extended European Search Report dated Jun. 23, 2020 in European Application No. 18813317.7-1205.

International Search Report and Written Opinion dated Aug. 15, 2018 for PCT/CN2018/090072 filed on Jun. 6, 2018, 10 pages including English Translation of the International Search Report.

3GPP, "Study on New Radio (NR) Access Technology", 3GPP TR 38.802 V1.0.0, Nov. 24, 2016, pp. 1-64.

Han et al., "Massive MIMO Technology Standard Progress and Development", Designing Techniques of Posts and Telecommunications, Mar. 20, 2017, pp. 1-4.

* cited by examiner (a) Deactivate utilization of idle resource elements (b) Activate utilization of idle resource elements

APPARATUS AND METHOD IN WIRELESS COMMUNICATION SYSTEM

CROSS-REFERENCE TO RELATED APPLICATIONS

This application is based on PCT filing PCT/CN2018/090072, filed Jun. 6, 2018, which claims the priority to Chinese Patent Application No. 201710433713.0, titled "APPARATUS AND METHOD IN WIRELESS COMMUNICATION SYSTEM", filed on Jun. 9, 2017 with the China National Intellectual Property Administration, the entire contents of each are incorporated herein by reference.

FIELD

The present disclosure generally relates to the technical field of wireless communication, and in particular to a device and a method in a wireless communication system for improving utilization of idle time-frequency resources in a beam sweeping procedure.

BACKGROUND

Two mainstream channel state information-reference signal (CSI-RS) mapping structures that are proposed nowadays are respectively applicable to the beam sweeping function and the CSI feedback function.

As antenna ports in new wireless multiple input multiple output (NR MIMO) systems continue to increase, the number of transmission beams and reception beams involved in beam sweeping is also increasing. Therefore, in a high-load, high-moving speed scenario, beam sweeping may consume a large amount of system resources. In the existing CSI-RS mapping structure for the beam sweeping function, there are idle resource elements (REs) which are not utilized. As the number of transmission beams and reception beams involved in beam sweeping increases, there will be more and more idle REs, resulting in a large amount of wasted resources.

SUMMARY

An overview of the present disclosure is given hereinafter, to provide basic understanding regarding some aspects of the present disclosure. However, it should be understood that the overview is not an exhaustive overview of the present disclosure, and is not intended to determine a critical part or an important part of the present disclosure, or to limit the scope of the present disclosure. The overview is only intended to give some concepts of the present disclosure in a simplified way, as a preface of detailed description given later.

In view of the above, according to at least one aspect of the present disclosure, it is an object of the present disclosure to provide a device and a method in a wireless communication system for improving utilization of idle REs in a beam sweeping procedure.

According to an aspect of the present disclosure, a device in a wireless communication system is provided. The device includes processing circuitry configured to: determine idle resource elements in a P2 procedure and/or a P3 procedure based on a channel state information-reference signal (CSI-RS) mapping structure, wherein only transmission beam sweeping is performed in the P2 procedure, only reception beam sweeping is performed in the P3 procedure, and the idle resource elements are resource elements which are not occupied by CSI-RS in an OFDM symbol occupied by CST-RS; and control, when the P2 procedure and/or the P3 procedure is performed, a base station to transmit data and/or control information to user equipment by utilizing the idle resource elements.

According to another aspect of the present disclosure, a device in a wireless communication system is provided. The device includes processing circuitry configured to: control, according to a channel state information-reference signal (CSI-RS) mapping structure notified by a base station, user equipment to receive data and/or control information transmitted by the base station utilizing idle resource elements in performing a P2 procedure and/or a P3 procedure, wherein only transmission beam sweeping is performed in the P2 procedure, only reception beam sweeping is performed in the P3 procedure, and the idle resource elements are resource elements not occupied by CSI-RS in an OFDM symbol occupied by CSI-RS, which are determined based on the CSI-RS mapping structure.

According to another aspect of the present disclosure, a method in a wireless communication system is provided. The method includes: determining idle resource elements in a P2 procedure and/or a P3 procedure based on a channel state information-reference signal (CSI-RS) mapping structure, wherein only transmission beam sweeping is performed in the P2 procedure, only reception beam sweeping is performed in the P3 procedure, and the idle resource elements are resource elements which are not occupied by CSI-RS in an OFDM symbol occupied by CSI-RS; and controlling, when the P2 procedure and/or the P3 procedure is performed, a base station to transmit data and/or control information to user equipment by utilizing the idle resource elements.

According to another aspect of the present disclosure, a method in a wireless communication system is provided. The method includes: controlling, according to a channel state information-reference signal (CSI-RS) mapping structure notified by a base station, user equipment to receive data and/or control information transmitted by the base station utilizing idle resource elements in performing a P2 procedure and/or a P3 procedure, wherein only transmission beam sweeping is performed in the P2 procedure, only reception beam sweeping is performed in the P3 procedure, and the idle resource elements are resource elements not occupied by CSI-RS in an OFDM symbol occupied by CSI-RS, which are determined based on the CSI-RS mapping structure.

According to another aspect of the present disclosure, there are further provided a computer program code and a computer program product for implementing the method according to the present disclosure, and a computer readable storage medium on which a computer program code for implementing the method according to the present disclosure is recorded.

According to the embodiments of the present disclosure, data and/or control information is transmitted by utilizing idle time-frequency resources in a beam sweeping procedure, such that utilization of time-frequency resources can be significantly improved as compared with the conventional technology.

Other aspects of the embodiments of the present disclosure are given in the following description, in which the detailed description is used for fully disclosing, without limiting, preferred embodiments of the disclosed disclosure.

BRIEF DESCRIPTION OF TRE DRAWINGS

The present disclosure can be understood better with reference to the detail description given in conjunction with the drawings in the following. The same or similar element is indicated by the same or similar reference numeral throughout all the drawings. The drawings, together with the following detailed description, are included in and form a part of the specification, and serve to further illustrate the preferred embodiments of the present disclosure and to explain the principle and advantages of the present disclosure by way of example. In the drawings.

DETAILED DESCRIPTION

Figure 1:
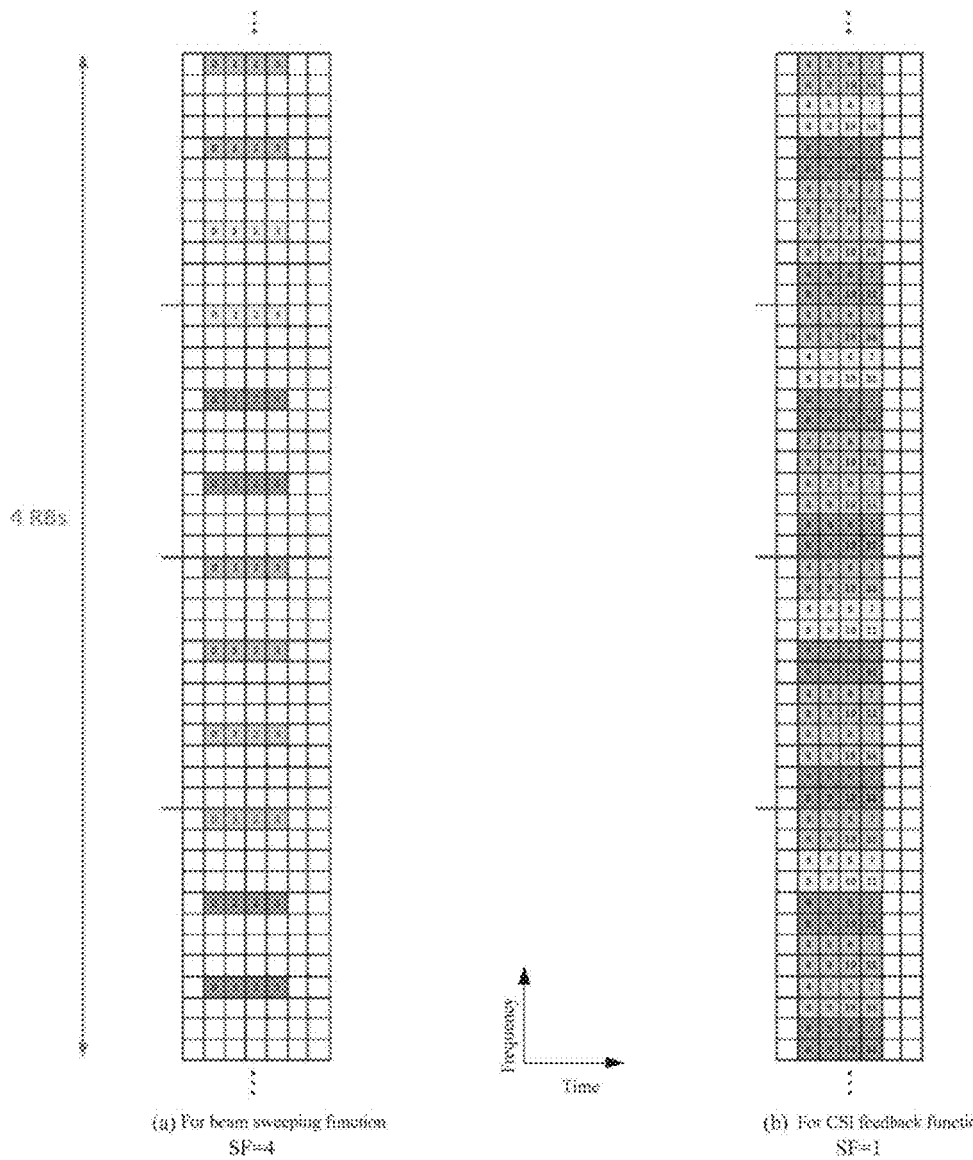
FIG. 1 is a schematic diagram illustrating examples of two typical CSI-RS mapping structure.

Exemplary embodiments of the present disclosure will be described below in conjunction with the accompanying drawings. For the sake of clarity and conciseness, not all the features of practical implementations are described in the specification. However, it is to be appreciated that many implementation-specific decisions shall be made during developing any of such practical implementations so as to achieve the developer's specific goals, for example, to comply with system- and business-related constraining conditions which will vary from one implementation to another. Furthermore, it should also be understood that although the development work may be very complicated and time-consuming, for those skilled in the art benefiting from the present disclosure, such development work is only a routine task.

It is further to be noted here that, to avoid obscuring the present disclosure due to unnecessary details, only the device structure and/or processing step closely related to the solution of the present disclosure are shown in the drawings, and other details less related to the present disclosure are omitted.

In the following, preferred embodiments of the present disclosure will be described in detail in conjunction with FIGS. 1 to 17.

Before describing in detail the technology according to the present disclosure, two typical CSI-RS mapping structures will be briefly described with reference to FIG. 1. FIG. 1 is a schematic diagram illustrating examples of two typical CSI-RS mapping structures.

In the examples of the CSI-RS mapping structures shown in FIG. 1, the horizontal direction represents a time direction, the vertical direction represents a frequency direction, and each square represents one resource element (RE), such that each column corresponds to one OFDM symbol, and each row corresponds to one Subcarrier. In the example shown in FIG. 1, four resource blocks (RBs) are shown, each resource block including 7 OFDM symbols*12 subcarriers. It should be noted that the respective numbers of OFDM symbols and subcarriers included in one resource block shown here and in subsequent drawings are merely an example and not a limitation, and the technology of the present disclosure is applicable to cases including any number of OFDM symbols and any number of subcarriers.

The CSI-RS mapping structure shown in (a) of FIG. 1 is suitable for the beam sweeping function. The beam sweeping procedure may include a P1 procedure, a P2 procedure, and a P3 procedure. In the P1 procedure, the transmission beam sweeping and the reception beam sweeping are simultaneously performed. In the P2 procedure, only the transmission beam sweeping is performed. In the P3 procedure, only the reception beam sweeping is performed. More specifically, in the P1 procedure, a receiving end (for example, user equipment) performs measurement for different transmission beams to support transmission beam selection of a transmitting end (for example, a base station) and reception beam selection of the receiving end; in the P2 procedure, the receiving end (for example, user equipment) performs measurement for different transmission beams to support transmission beam selection of the transmitting end (for example, a base station); and in the P3 procedure, the receiving end (for example, user equipment) performs measurement for the same transmission beam to support reception beam selection of the receiving end in a case that beam forming is adopted.

Specifically, in the example shown in (a) of FIG. 1, the CSI-RS for the beam sweeping function occupies four OFDM symbols (that is, the OFDM symbols of the columns where the resource elements marked by numerals 0, 1, 2, and 3 are present; here, the numerals indicate the antenna ports for transmitting the CSI-RS), and a sub-sampling factor (SF) is formed by idle REs that are located between the REs occupied by the CSI-RS (that is, the REs that are not marked by numerals). In this example, SF=4.

The CSI-RS mapping structure shown in (b) of FIG. 1 is suitable for the CSI feedback function. In this mapping structure, SF=1. Since the CSI-RS has a relatively condense configuration so that an accurate CSI feedback result can be obtained, this mapping structure is more suitable for the CSI feedback function.

Figure 2:
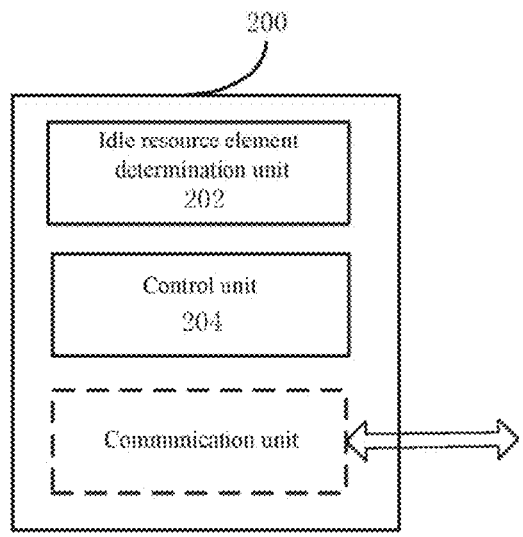
FIG. 2 is a block diagram illustrating a functional configuration example of a device in a wireless communication system according to an embodiment of the present disclosure.

FIG. 2 is a block diagram illustrating a functional configuration example of a device in a wireless communication system according to an embodiment of the present disclosure.

As shown in FIG. 2, the device 200 according to this embodiment may include an idle resource element determination unit 202 and a control unit 204.

The idle resource element (RE) determination unit 202 may be configured to determine idle resource elements in the P2 procedure and/or the P3 procedure based on a CSI-RS mapping structure. The idle resource elements are resource elements which are not occupied by CSI-RS in an OFDM symbol occupied by CSI-RS.

Specifically, referring to the CSI-RS mapping structure shown in (a) of FIG. 1, in order to perform the P1 procedure, an interleaved frequency division multiple access (IFDMA) model may be constructed by using SFs, that is, allocating CSI-RS to idle subcarriers on the same OFDM symbol at equal intervals in the frequency domain. For example, in a case that SF=4, according to the IFDMA model, one CSI-RS is repeatedly transmitted three times on idle REs on the same OFDM symbol. Therefore, in this example, one CSI-RS is repeatedly transmitted four times in the frequency domain, such that the user has four chances of sweeping its own candidate reception beam in a single OFDM symbol. The sweeping of the candidate transmission beam may be performed in the time domain.

In another aspect, when the P2 procedure or the P3 procedure is performed, since transmission beam sweeping or reception beam sweeping can be implemented only in the time domain, it is not required to construct the IFDMA model, and the idle REs that are located between the REs occupied by the CSI-RS (i.e. REs corresponding to the squares that are located between the squares marked with numerals as shown in (a) of FIG. 1) are not utilized.

Since the idle REs that are located between the REs occupied by the CSI-RS in the P1 procedure are required to be idle for implementing reception beam sweeping in the frequency domain, in the technology according to an embodiment of the present disclosure, only the idle REs in the P2 procedure and/or the P3 procedure are considered to be utilized to transmit data and/or control information to improve utilization of idle REs.

In addition, it should be noted that, for idle REs other than the idle REs that are located between the REs occupied by the CSI-RS for the beam sweeping function as shown in FIG. 1 (for example, the idle REs in the last two columns of OFDM symbols as shown in (a) and (b) of FIG. 1), since they have been used for transmitting data and/or control information in the conventional technology, these idle REs are not discussed herein. The idle resource elements utilized in the present disclosure refer to only the idle REs that are located between the REs occupied by the CSI-RS for the beam sweeping functions.

The control unit 204 may be configured to control, when the P2 procedure and/or the P3 procedure is performed, the base station to transmit data and/or control information to the user equipment by utilizing the idle resource elements in the CSI-RS mapping structure. The user equipment may receive the transmitted data and/or control information on the corresponding idle resource elements according to the CSI-RS mapping structure notified by the base station. In this way, the utilization of idle REs in the P2 procedure and in the P3 procedure can be improved.

Figure 3:
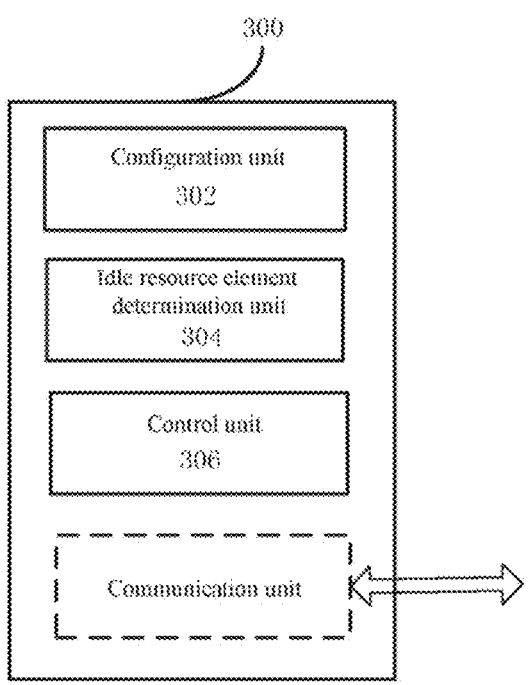
FIG. 3 is a block diagram illustrating another functional configuration example of a device in a wireless communication system according to an embodiment of the present disclosure.

FIG. 3 is a block diagram illustrating another functional configuration example of a device in a wireless communication system according to an embodiment of the present disclosure.

As shown in FIG. 3, the device 300 according to this embodiment may include a configuration unit 302, an idle resource element determination unit 304, and a control unit 306. The functional configuration examples of the idle resource element determination unit 304 and the control unit 306 are substantially the same as those of the corresponding units described above with reference to FIG. 2, and are not repeated here. Only a functional configuration example of the configuration unit 302 is described in detail below.

The configuration unit 302 may be configured to configure, for each user equipment, the CSI-RS mapping structure based on at least the number of to-be-swept transmission beams and/or reception beams and a sub-sampling factor, and to notify the CSI-RS mapping structure to the user equipment.

Specifically, as described above with reference to FIG. 1, if the P1 procedure is to be performed for user equipment, the CSI-RS mapping structure may be configured by setting the number of OFDM symbols occupied by the CSI-RS to be equal to the number of to-be-swept transmission beams and setting the sub-sampling factor to be equal to the number of to-be-swept reception beams. In another aspect, if the P2 procedure or the P3 procedure is to be performed for the user equipment, the CSI-RS mapping structure may be configured based on a preset sub-sampling factor by setting the number of OFDM symbols occupied by the CSI-RS to be equal to the number of to-be-swept transmission beams or reception beams. The configured CSI-RS mapping structure may be, for example, as shown in (a) of FIG. 1.

According to the conventional technology, the CSI mapping structure for the beam sweeping function and the CSI mapping structure for the CSI feedback function are separately, independently configured, as shown in (a) and (b) of FIG. 1, respectively. However, in order to implement a flexible CSI-RS resource configuration to achieve both functions simultaneously with a smaller resource granularity, a combined, configurable CSI-RS mapping structure is provided according to the present disclosure. A preferred embodiment thereof is described in detail below.

Preferably, the configuration unit 302 is further configured to configure, for each user equipment, the CSI-RS mapping structure in a manner that OFDM symbols included in one resource block are respectively occupied by a CSI-RS for beam sweeping and a CSI-RS for channel state information (CSI) feedback.

Specifically, the configuration unit 302 is further configured to determine, for each user equipment, OFDM symbols occupied by the CSI-RS for beam sweeping in one resource block based on the number of the to-be-swept transmission breams and/or reception beams, and determine OFDM symbols occupied by the CSI-RS for CSI feedback in the one resource block based on the OFDM symbols occupied by the CSI-RS for beam sweeping, thus configuring the CSI-RS mapping structure.

It should be understood that, if the number of to-be-swept transmission/reception beams is relatively large such that in a resource block, no free OFDM symbol can be used for arranging the CSI-RS for CSI feedback function, the configured CSI-RS mapping structure may include only the CSI-RS for the beam sweeping function, as shown in (a) of FIG. 1. That is, the combined structure can be flexibly configured according to actual conditions.

In addition, preferably, the configuration unit 302 may be further configured to configure, for each user equipment, the CSI-RS mapping structure in a manner that, in one resource block, the OFDM symbols occupied by the CSI-RS for beam sweeping are arranged before the OFDM symbols occupied by the CSI-RS for CSI feedback. This is because the CSI-RS is generally first used for performing the beam sweeping function to determine the optimal transmission/reception beam pair, and then the determined optimal transmission/reception beam pair is used for transmitting the CSI-RS to perform channel state feedback. Therefore, it is preferable to arrange the CSI-RS for the beam sweeping function before the CSI-RS for the CSI feedback function. That is, the OFDM symbols occupied by the CSI-RS for the beam sweeping function precede the OFDM symbols occupied by the CSI-RS for the CSI feedback function in time.

Figure 4:
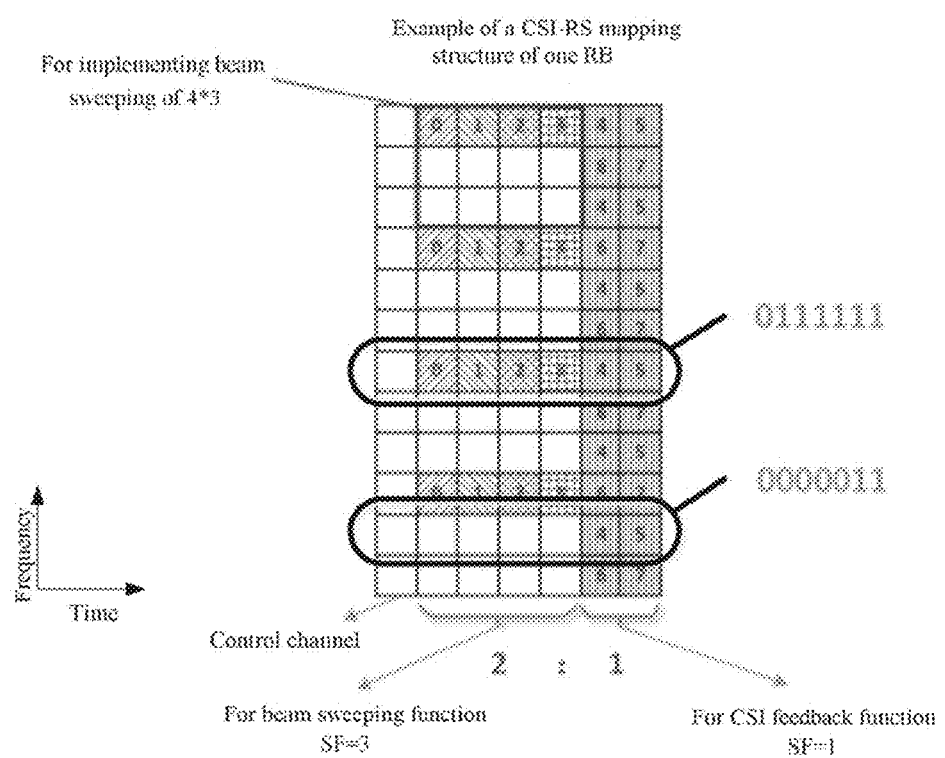
FIG. 4 is a schematic diagram illustrating an example of a CSI-RS mapping structure having a combined configuration according to an embodiment of the present disclosure.

FIG. 4 illustrates an example of a combined CSI-RS mapping structure in one resource block (RB). FIG. 4 is a schematic diagram illustrating an example of a CSI-RS mapping structure in a combined configuration according to an embodiment of the present disclosure. The numeral marked on each resource element indicates a serial number of an antenna port that corresponds to the CSI-RS occupying the resource element.

In one resource block, the first OFDM symbol is generally used for transmission of a control channel, and thus the number of OFDM symbols available for CSI-RS is six. As shown in FIG. 4, the first four OFDM symbols are occupied by the CSI-RSs for the beam sweeping function (corresponding to antenna ports 0, 1, 2, and 3, respectively), which indicates that the number of to-be-swept transmission beams/reception beams in this case is 4, and the remaining OFDM symbols, i.e. the last two OFDM symbols, may be occupied by the CSI-RSs for the CSI feedback function (corresponding to antenna ports 4, 5, 6, and 7 respectively). In this example, the SFs used in the two functions are SF=3 and SF=1, respectively. Therefore, the CSI-RS mapping structure can be used for implementing beam sweeping of 4*3, while implementing the CSI feedback function.

It should be noted that although OFDM symbols occupied by the CSI-RS are shown as consecutive ones in the example of FIG. 4, the occupied OFDM symbols may be configured to be inconsecutive ones according to actual situations, which is not limited in the present disclosure. In addition, it should be noted that although the resource elements occupied by the respective CSI-RSs correspond to different antenna ports in the example shown in FIG. 4, it can be configured such that the resource elements occupied by the respective CSI-RSs correspond to the same antenna port according to actual conditions, which is not limited in the present disclosure. The above configuration applies to subsequent drawings and the description related thereto.

As can be seen, according to the embodiment of the present disclosure, by configuring the CSI-RS for the beam sweeping function and the CSI-RS for the CSI feedback function in one resource block, resources can be flexibly configured and scheduled with a smaller resource granularity, thus further improving resource utilization.

Preferably, to facilitate notification of the determined CSI-RS mapping structure to the user equipment, the configuration unit 302 may be further configured to represent the determined CSI-RS mapping structure in a form of a bitmap. Specifically, the bitmap may be generated in a manner that each subcarrier in one resource block corresponding to one bit sequence, wherein in each subcarrier, a resource element occupied by the CSI-RS is represented as 1, and a resource element which is not occupied by the CSI-RS is represented as 0. It should be noted that, as described above, the resource elements in the first OFDM symbol in one resource block are usually used for transmission of the control channel, and thus notification of bits corresponding to the resource elements in this OFDM symbol are not considered in the present disclosure, and the notification may be performed in an existing manner in the conventional technology. For convenience of description of embodiments of the present disclosure, description will be made herein assuming that resource elements in the first OFDM symbol are each represented as "0". In addition, it should also be noted that the case described herein where the control channel occupies the first OFDM symbol is merely an example and not a limitation. For example, in one sub-frame (which includes, for example, two resource blocks), the first four OFDM symbols of each resource block may be used for the control channel. For example, in the example shown in FIG. 4, the bit sequences corresponding to the two subcarriers that are circled may be represented as "0000011" and "0111111", respectively.

In order that the user equipment can accurately know the complete CSI-RS mapping structure in one resource block, the bitmap corresponding to the entire resource block (that includes 12*7=84 bits) may be notified to the user equipment to inform the CSI-RS mapping structure, which, however, results in a large signaling overhead.

Therefore, preferably, the CSI-RS mapping structure may be notified to the user equipment by selectively transmitting bit sequences corresponding to some subcarriers and other auxiliary information (for example, the size of the SF) to reduce the signaling overhead.

For example, if the CSI-RS mapping structure is the non-combined structure shown in FIG. 1, the base station may be controlled to transmit at least a bit sequence for example, 7 bits) corresponding to one subcarrier (the subcarrier is required to include the resource elements occupied by the CSI-RS) and a bit sequence (for example, 4 bits) indicating the current sub-sampling factor, so as to notify the user equipment of the OFDM symbols occupied by the CSI-RS, thereby notifying the configured CSI-RS mapping structure.

In another aspect, if the CSI-RS mapping structure is the combined structure shown in FIG. 4, the base station may be controlled to transmit at least bit sequences (for example, 14 bits) corresponding to two subcarriers, a bit sequence (for example, (4+4) bits) indicating sub-sampling factors of both functions, and a bit sequence (for example, 3 bits) indicating the number of OFDM symbols occupied by the CSI-RS for beam sweeping, so as to notify the user equipment of the CSI-RS mapping structure.

It should be understood that the bit sequences for two subcarriers to be transmitted can be selected such that the selected two bit sequences can reflect the distribution of OFDM symbols occupied by the CSI-RSs of both functions. For example, in the example shown in FIG. 4, the configuration unit 302 may select to transmit the bit sequences "0000011" and "0111111" corresponding to the two subcarriers that are circled. With these bit sequences in combination with the transmitted sub-sampling factors of both functions, the user equipment may know that the second to fifth OFDM symbols in the CSI-RS mapping structure correspond to the beam sweeping function, and the sixth and seventh OFDM symbols correspond to the CSI feedback function. In contrast, if the bit sequences "0000011" and "0000011" corresponding to the first and second subcarriers are selected to be transmitted, the user equipment cannot accurately know the distribution of the OFDM symbols occupied by the CSI-RSs for the two functions, so that more bit sequences are required to be transmitted.

The bit sequences for the two subcarriers to be transmitted may be selected according to actual conditions, and are not limited in the present disclosure, as long as they can enable user equipment to accurately determine distribution of the OFDM symbols occupied by the CSI-RSs for both functions.

The CSI-RS mapping structure may be notified through downlink control information (DCI) of the physical layer, MAC layer signaling, high-level radio resource control (RRC) signaling, or a combination thereof. The signaling for notification may be selected by a person skilled in the art according to actual conditions, and is not limited in the present disclosure. For example, if a high requirement is imposed on the real-time performance and the CSI-RS mapping structure changes frequently, DCI with higher real-time performance may be considered for notification; and if the CSI-RS mapping structure is relatively fixed, the RRC signaling with a relatively long notification period may be considered for notification, so as to save signaling resources of the physical layer.

Figure 5:
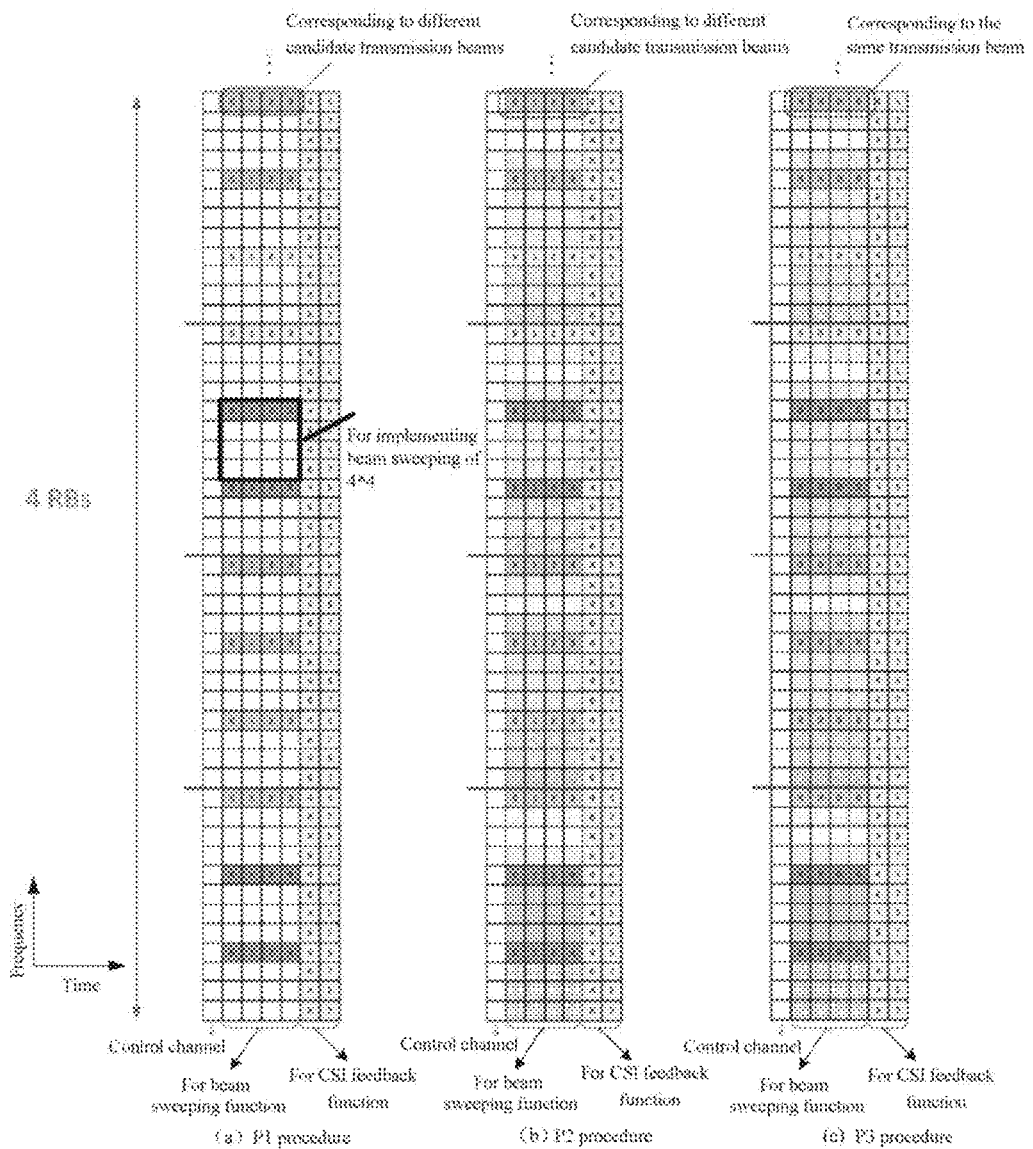
FIG. 5 is a schematic diagram illustrating examples of combined CSI-RS mapping structures respectively applicable to a P1 procedure, a P2 procedure, and a P3 procedure according to an embodiment of the present disclosure.

FIG. 5 illustrates combined CSI-RS mapping structures applied to the P1 procedure, the P2 procedure, and the P3 procedure according to an embodiment of the present disclosure. It should be noted that in FIG. 5, illustration is made in a manner that one antenna port corresponds to one transmission beam for ease of description and differentiation, but this manner is only an example and not a limitation. A configuration that all transmission beams correspond to the same antenna port may also be adopted, and this is also applicable to subsequent drawings and the description related thereto.

The CSI-RS mapping structure shown in (a) of FIG. 5 is applicable to the P1 procedure. In this example, the second to the fifth OFDM symbols correspond to the beam sweeping function, the sixth and seventh OFDM symbols correspond to the CSI feedback function, and the sub-sampling factors corresponding to the two functions are SF=4 and SF=1, respectively. In this mapping structure, as described above, idle resource elements (idle REs in the first to third subcarriers, the fifth to seventh subcarriers, and the ninth to eleventh subcarriers in one RB) that are located between the resource elements occupied by the CSI-RS for beam sweeping (that is, resource elements marked with numerals 0, 1, 3) are to be reserved for constructing the IFDMA mode, thereby simultaneously implementing transmission beam sweeping and reception beam sweeping. In the example shown in (a) of FIG. 5, it may be configured to transmit the CSI-RS in a manner that one OFDM symbol corresponds to one candidate transmission beam, and to repeatedly transmit it four times in the frequency domain, so that a beam sweeping procedure of 4 (transmission beams)*4 (reception beams) can be realized.

The CSI-RS mapping structures shown in (b) and (c) of FIG. 5 are applicable to the P2 procedure and the P3 procedure, respectively. These CSI-RS mapping structures are similar to the CSI-RS mapping structure for the P1 procedure shown in (a) of FIG. 5, except that since only the transmission beam sweeping is performed in the P2 procedure and only the reception beam sweeping is performed in the P3 procedure, resource elements which are to be reserved in (a) of FIG. 5 (that is, REs in the first to third subcarriers, the fifth to seventh subcarriers, and the ninth to eleventh subcarriers in one RB) do not need to be reserved to construct the IFDMA mode. Therefore, these idle resource elements can be utilized to transmit data and/or control information. How to transmit data and/or control information by utilizing these idle resource elements will be described in detail below with reference to FIG. 6.

In the example shown in (b) of FIG. 5, it may be configured to transmit the CSI-RS in a manner that one OFDM symbol corresponds to one candidate transmission beam, and the user equipment receives, by utilizing the same reception beam, the CSI-RSs transmitted by respectively utilizing four candidate transmission beams, to implement sweeping of the four candidate transmission beams. In the example shown in (c) of FIG. 5, it may be configured to transmit the CSI-RS in a manner that the four OFDM symbols correspond to the same transmission beam, so that the user equipment can receive the CSI-RSs from the same transmission beam by sequentially utilizing four different candidate reception beams, to implement sweeping of the four candidate reception beams.

It should be noted that, in the example shown in (b) of FIG. 5, the resource elements occupied by the CSI-RS in the P2 procedure are marked with different antenna ports 0, 1, 2, and 3, and in the example shown in (c) of FIG. 5, the resource elements occupied by the CSI-RS in the P3 procedure are marked with the same antenna port 0, for convenience of indicating that the different candidate transmission beams are used for transmitting the CSI-RS in the P2 procedure to implement transmission beam sweeping, and the same transmission beam is used for transmitting the CSI-RS in the P3 procedure and the CSI-RS is transmitted repeatedly using the transmission beam to implement reception beam sweeping. However, in practice, the resource elements occupied by the CSI-RS may correspond to the same or different antenna ports, in either of the P2 procedure or the P3 procedure, as long as the transmission beam sweeping and the reception beam sweeping functions can be respectively implemented, which is not limited in the present disclosure.

Referring back to FIG. 3, preferably, in a case that data and/or control information is transmitted by utilizing the idle resource elements in the P2 procedure and in the P3 procedure, the control unit 306 may be configured to control the base station to transmit, in idle resource elements of one OFDM symbol occupied by the CSI-RS, data and/or control information by utilizing a transmission beam which is the same as the transmission beam for transmitting the CSI-RS occupying the OFDM symbol.

Further, preferably, the control unit 306 may be configured to control the base station to utilize all idle resource elements in a same subcarrier to transmit the same data and/or control information. This is because in the beam sweeping procedure, the optimal transmission-reception beam pair is not yet determined, and when the data and/or control information is transmitted by utilizing the idle resource elements, the same data and/or control information may be transmitted by utilizing all idle resource elements in the same subcarrier, to implement transmission diversity or reception diversity.

Figure 6:
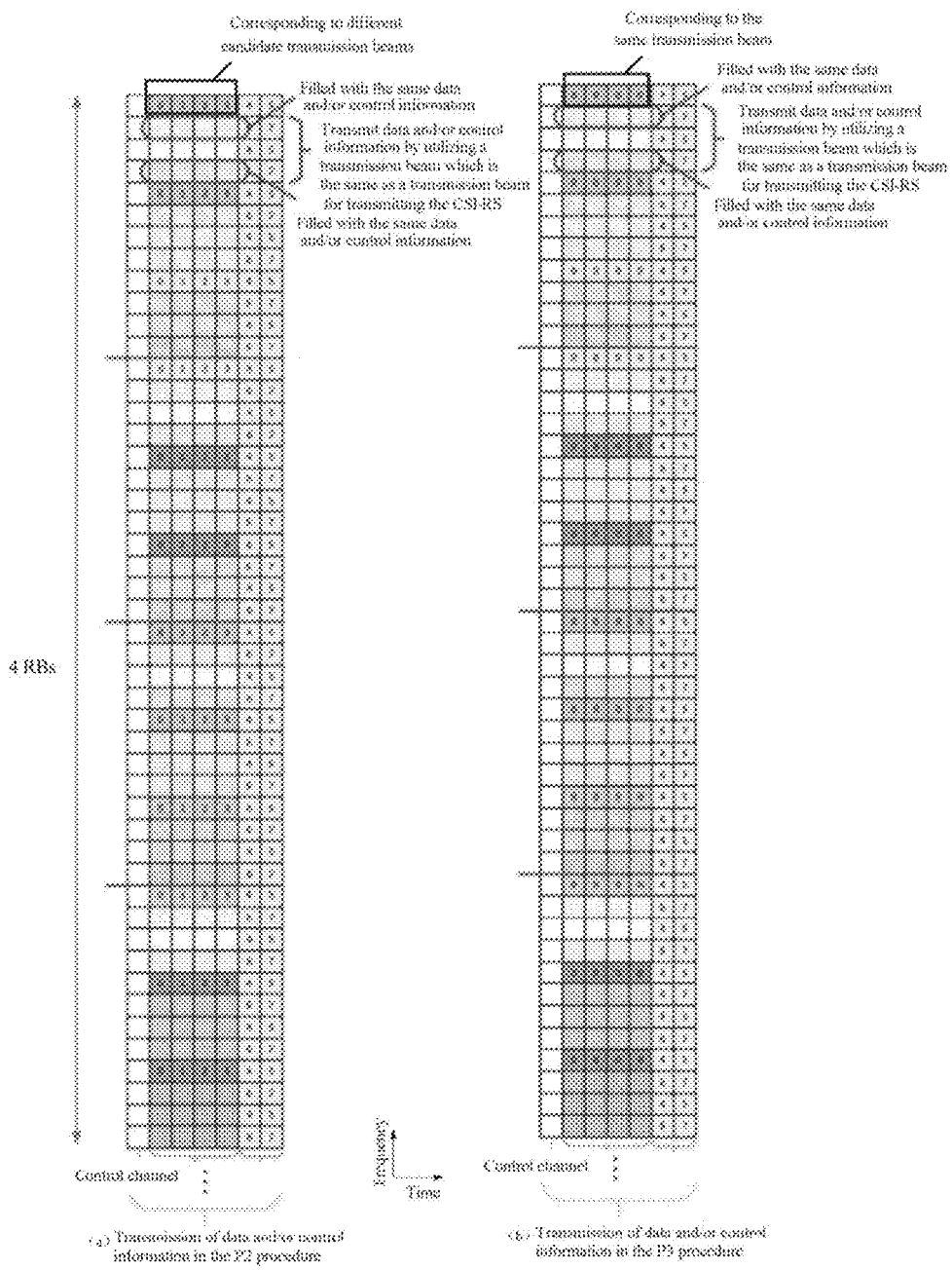
FIG. 6 is a schematic diagram illustrating examples of transmitting data and/or control information by utilizing idle resource elements in the P2 procedure and in the P3 procedure according to an embodiment of the present disclosure.

An example of how to transmit data and/or control information by utilizing idle resource elements in the P2 procedure and in the P3 procedure will be described in further detail below with reference to FIG. 6. FIG. 6 is a schematic diagram illustrating examples of transmitting data and/or control information by utilizing idle resource elements in the P2 procedure and in the P3 procedure according to an embodiment of the present disclosure.

Here, it should be noted that although the CSI-RS mapping structure with the combined configuration is taken as an example to describe how to transmit data and/or control information by utilizing idle resource elements in the P2 procedure and in the P3 procedure in FIG. 6, this is merely an example and not a limitation, and the manner in which the data and/or control information is transmitted described herein is also applicable to the non-combined CSI-RS mapping structure example, the CSI-RS mapping structure shown in (a) of FIG. 1).

An example of transmitting data and/or control information by utilizing idle resource elements in the P2 procedure is illustrated in (a) of FIG. 6.

For the P2 procedure, since the transmitting end (e.g., the base station) perform transmission by utilizing different transmission beams to implement transmission beam sweeping, and the receiving end (for example, user equipment) perform reception by utilizing the same reception beam, the transmission diversity technique is adopted such that the transmitting end transmits the same data and/or control information by utilizing different candidate transmission beams, and the receiving end receives the same data and/or control information by utilizing the same reception beam, thus implementing transmission diversity.

Specifically, as shown in (a) of FIG. 6, it is assumed that the resource elements occupied by the CSI-RS for the beam sweeping function correspond to the antenna ports 0, 1, 2, and 3, which respectively correspond to transmission beams TX0, TX1, TX2, and TX3. In the idle resource elements belonging to the same subcarrier that are below the resource elements marked by the numerals 0, 1, 2, and 3, the same data and/or control information is transmitted by utilizing the transmission beams TX0, TX1, TX2, and TX3, respectively. That is, the idle resource elements in the same subcarrier which is circled in (a) of FIG. 6 are used to carry the same data and/or control information. The data and/or control information carried by the idle resource elements in different sub-carriers may be the same or different, and may be set according to actual conditions, which is not limited in the present disclosure.

In this way, the receiving end may receive, according to the CSI-RS mapping structure notified by the transmitting end, data and/or control information from different transmission beams TX0, TX1, TX2, and TX3 on the corresponding time-frequency resources (that is, the idle resource elements that are located between the resource elements occupied by the CSI-RS) by utilizing the same reception beam, and combine and demodulate all the received data and/or control information (that is, combine the diversely received multiple pieces of data in a certain manner) to recover the data and/or control information from the transmitting end.

An example of transmitting data and/or control information by utilizing idle resource elements in the P3 procedure is shown in (b) of FIG. 6.

For the P3 procedure, since the transmitting end performs transmission by utilizing the same transmission beam and the receiving end performs reception by utilizing different candidate reception beams, the reception diversity technique is adopted such that the transmitting end repeatedly transmits the same data and/or control information four times by utilizing the same transmission beam, and the receiving end receives the repeatedly transmitted data and/or control information by respectively utilizing different candidate reception beams, and combines the received data and/or control information through a combining technique to recover the original transmitted data and/or control information, while obtaining a diversity gain.

Specifically, in the example shown in (b) of FIG. 6, the principle of transmitting data and/or control information by utilizing the idle resource element is substantially the same as the principle in the example shown in (a) of FIG. 6, except that the transmitting end repeatedly transmits the same data and/or control information by utilizing the same transmission beam TX0 (corresponding to antenna port 0), so that the receiving end receives, according to the notified CSI-RS mapping structure, the data and/or control information from transmission beam TX0 on the corresponding time-frequency resources (that is, the idle resource elements) by respectively utilizing the candidate reception beams (which are assumed to be RX0, RX1, RX2, and RX3 in this example) and combines and demodulates all the received data in a certain manner to recover the data and/or control information from the transmitting end.

Preferably, whether utilization of the idle REs is to be activated may be determined according to the number of user equipment triggering the base station to perform the P2 procedure and/or the P3 procedure. Specifically, if a small number of user equipment triggers the base station to perform the P2 procedure and/or the P3 procedure, the waste of idle REs may be relatively small. Thus, it is unnecessary to transmit data and/or control information by utilizing the idle REs, such that signaling overheads for this process can be reduced and implementation complexity can be reduced. On the other hand, if a great number of user equipment triggers the base station to perform the P2 procedure and/or the P3 procedure, the waste of idle REs may be relatively large. Thus, utilization of idle REs may be activated in this case in order to improve resource utilization. A configuration example in this case will be described below with reference to FIG. 7.

Figure 7:
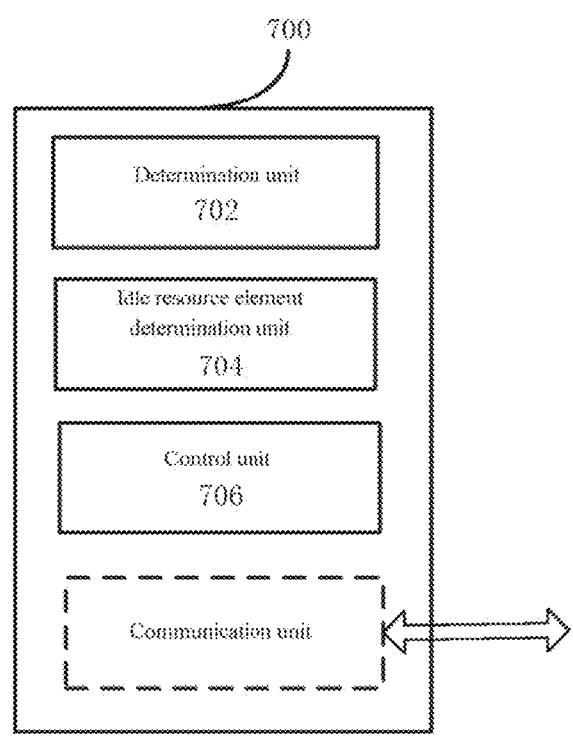
FIG. 7 is a block diagram illustrating yet another functional configuration example of a device in a wireless communication system according to an embodiment of the present disclosure.

FIG. 7 is a block diagram illustrating another functional configuration example of a device in a wireless communication system according to an embodiment of the present disclosure.

As shown in FIG. 7, the device 700 according to this embodiment may include a determination unit 702, an idle resource element determination unit 704, and a control unit 706. The functional configuration examples of the idle resource element determination unit 704 and the control unit 706 are substantially the same as those of the corresponding units described above with reference to FIGS. 2 and 3, and are not repeated here. A functional configuration example of the determination unit 702 will be described in detail below.

The determination unit 702 may be configured to determine whether to activate utilization of the idle resource elements in the P2 procedure and/or the P3 procedure according to the number of user equipment triggering the base station to perform the P2 procedure and/or the P3 procedure and to notify a determination result to the user equipment.

Figure 8:
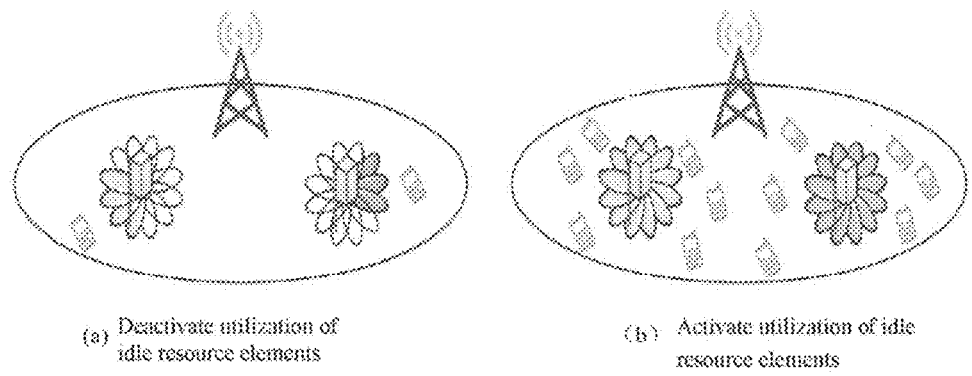
FIG. 8 is a schematic diagram illustrating an example of a communication scenario according to an embodiment of the present disclosure.

Specifically, the determination unit 702 may be further configured to deactivate utilization of the idle REs to reduce operation complexity, if the number of user equipment triggering the base station to perform the P2 procedure and/or the P3 procedure is less than the first threshold as in the communication scenario example shown in (a) of FIG. 8, which indicates that resource waste due to beam sweeping is relatively small in this case. The determination unit 702 may be further configured to perform a beam sweeping procedure over a full cell range to improve the efficiency of beam sweeping, if the number is higher than a second threshold, which indicates that a great number of user equipment requires beam sweeping (the communication scenario example is not shown in the drawings). The determination unit 702 may be further configured to activate utilization of the idle REs to improve resource utilization, if the number is between the first threshold and the second threshold as in the communication scenario example shown in (b) of FIG. 8, which indicates that resource waste due to beam sweeping is relatively large in this case. Preferably, the first threshold is less than the second threshold, and the values of the first threshold and the second threshold may be appropriately set according to actual communication scenarios, performance requirements, and the like, and are not limited in the present disclosure.

The control unit 706 may be configured to control the base station to transmit, in performing the P2 procedure and/or the P3 procedure, data and/or control information to the user equipment by utilizing the idle resource elements determined by the idle resource determination unit 704, if the determination unit 702 determines to activate utilization of the idle resource elements.

In addition, as described above, in the case of beam sweeping, the CSI-RS mapping structure configured by the base station is generally configured for each user equipment respectively in order to determine the optimal transmission-reception beam pair between the base station and the user equipment. That is, the CSI-RS mapping structure in the case of beam sweeping is generally specific to the user equipment (UE-specific), and the base station may notify the determined CSI-RS mapping structure to the respective user equipment by utilizing physical layer signaling (for example, DCI), MAC layer signaling, higher layer signaling (for example, RRC) or a combination thereof in the notification manner as described above. However, in the case that a great number of user equipment triggers the base station to perform the P2 procedure and/or the P3 procedure such that it is determined to perform the beam sweeping procedure over a full cell range, the CSI-RS mapping structure may be configured for all user equipment within the cell range corresponding to the base station. That is, the CSI-RS mapping structure in this case is specific to the cell (cell-specific), and the base station may notify the mapping structure to all of the user equipment by, for example, broadcasting, multicast, or the like.

As can be seen, according to the embodiments of the present disclosure, data and/or control information is transmitted by utilizing idle REs that are located between REs occupied by CSI-RS when the P2 procedure and/or the P3 procedure is performed, such that resource utilization can be significantly improved as compared with the conventional technology.

It should be noted that the devices 100, 300, and 700 in the wireless communication system may be implemented at a chip level, or may be implemented at a device level by including other peripheral components. For example, the above devices may also operate as the base station itself, and may also include a communication unit (which is optional and indicated by a dashed box) for performing communication with an external apparatus. For example, the communication unit may be configured to transmit the CSI-RS mapping structure, the determination result regarding utilization of the idle resource elements, CSI-RS, data and/or control information to the user equipment, and to receive feedback information from the user equipment, and the like. In addition, it should be further noted that the specific implementation of the communicating unit is not limited here, and it may include one or more communication interface(s) for realizing communication with different external apparatuses.

Corresponding to the device on the base station side, a configuration example of a device on a user equipment side is described below with reference to FIG. 9.

Figure 9:
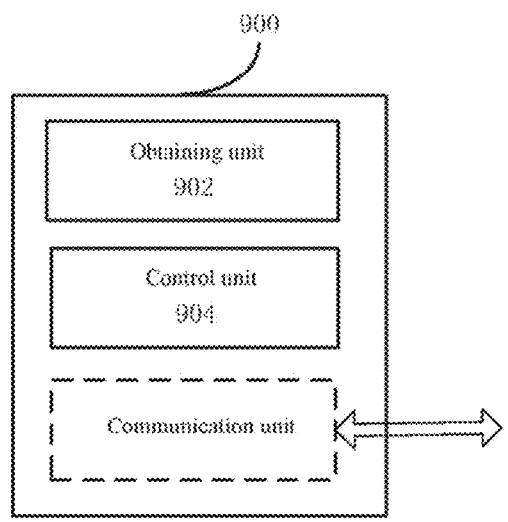
FIG. 9 is a block diagram illustrating a functional configuration example of a device in a wireless communication system according to an embodiment of the present disclosure.

FIG. 9 is a block diagram illustrating a functional configuration example of a device in a wireless communication system according to an embodiment of the present disclosure.

As shown in FIG. 9, the device 900 according to this embodiment may include an obtaining unit 902 and a control unit 904. Configuration examples of respective functional units are described in detail below.

The obtaining unit 902 may configured to obtain a CSI-RS mapping structure notified by the base station. Specifically, for example, the obtaining unit 902 may obtain, according to physical layer signaling (for example, DCI), MAC layer signaling, or higher layer signaling (for example, RRC signaling), or a combination thereof from the base station, the CSI-RS mapping structure for user equipment included in the signaling. The CSI-RS mapping structure may be a non-combined structure as shown in FIG. 1, or may be a combined structure as shown in FIGS. 4 and 5.

The control unit 904 may be configured to control, according to the obtained CSI-RS mapping structure, the user equipment to receive data and/or control information on corresponding time-frequency resources, the data and/or control information being transmitted by the base station utilizing idle resource elements in performing a P2 procedure and/or a P3 procedure.

Preferably, the obtaining unit 902 is further configured to obtain a determination result of the base station regarding whether to activate utilization of the idle resource elements in the P2 procedure and/or the P3 procedure, so that the control unit 904 may further control the user equipment to receive data and/or control information according to the determination result. Specifically, if the obtained determination result indicates that the base station is to transmit the data and/or control information by utilizing the idle resource elements in the P2 procedure and/or the P3 procedure, the control unit 904 may control, according to the CSI-RS mapping structure notified by the base station, the user equipment to receive, on the corresponding time-frequency resources, the data and/or control information transmitted by the base station utilizing the idle resource elements.

Preferably, when the P2 procedure for implementing transmission beam sweeping is performed, the control unit 904 may control the user equipment to utilize the same reception beam to receive CSI-RS, data and/or control transmitted by the base station using different to-be-swept transmission beams. Then, the user equipment may perform channel measurement and feedback according to the CSI-RS from different transmission beams received by utilizing the same reception beam so that the base station may determine an optimal transmission beam, and the user equipment may combine and demodulate the same data and/or control information, which is repeatedly transmitted by the base station utilizing different transmission beams and is received by utilizing the same reception beam, to recover the original data and/or control information from the base station.

Similarly, when the P3 procedure for implementing reception beam sweeping is performed, the control unit 904 may control the user equipment to sequentially utilizing different to-be-swept reception beams to receive the CSI-RS, data and/or control information transmitted by the base station utilizing the same transmission beam. Then, the user equipment performs channel measurement based on the CSI-RS from the same transmission beam received by utilizing different candidate reception beams to determine an optimal reception beam, and combine and demodulate the same data and/or control information, which is repeatedly transmitted by the base station utilizing the same transmission beam and is received by utilizing different candidate reception beams, to recover the original data and/or control information from the base station, thereby implementing reception diversity.

It should be noted that the device 900 may be implemented at a chip level, or may be implemented at a device level by including other peripheral components. For example, the device 900 may also operate as the user equipment itself, and may also include a communication unit (which is optional and indicated by a dashed box) for performing communication with an external apparatus. For example, the communication unit may be configured to receive the CSI-RS mapping structure, the determination result regarding utilization of the idle resource elements, CSI-RS, data and/or control information from the base station, and transmit the corresponding feedback information to the base station, and the like. In addition, it should be further noted that the specific implementation of the communicating unit is not limited here, and it may include one or more communication interface(s) for realizing communication with different external apparatuses.

The embodiment of the device 900 on the user equipment side described here corresponds to the embodiments of the devices 200, 300 and 700 on the base station side. Thus, for the contents which are not described in detail here in this embodiment, reference can be made to the above description at the corresponding positions which is not repeated here.

It should be noted that the various functional units described above with reference to FIGS. 2, 3, 7 and 9 are merely logical modules divided according to the specific functions thereof, and are not intended to limit the specific implementations. In the actual implementation, the functional units and modules may be implemented as separated physical entities, or may be implemented by a single entity (e.g., a processor (CPU, DSP or the like), an integrated circuit or the like).

In addition, it should be noted that although the device embodiments of the present disclosure have been described above with reference to block diagrams shown in FIGS. 2, 3, 7 and 9, these are exemplary rather than restrictive. A person skilled in the art may modify the shown functional configuration examples according to the principle of the present disclosure. For example, functional modules in various embodiments may be added, deleted, modified, combined or the like, and all of such modifications are considered to fall within the scope of the present disclosure.

In order to facilitate understanding of the operation principle of the technology of the present disclosure on a system level, a signaling interaction process according to the present disclosure is described below with reference to the flowcharts illustrated in FIGS. 10A to 10C.

Figure 10A:
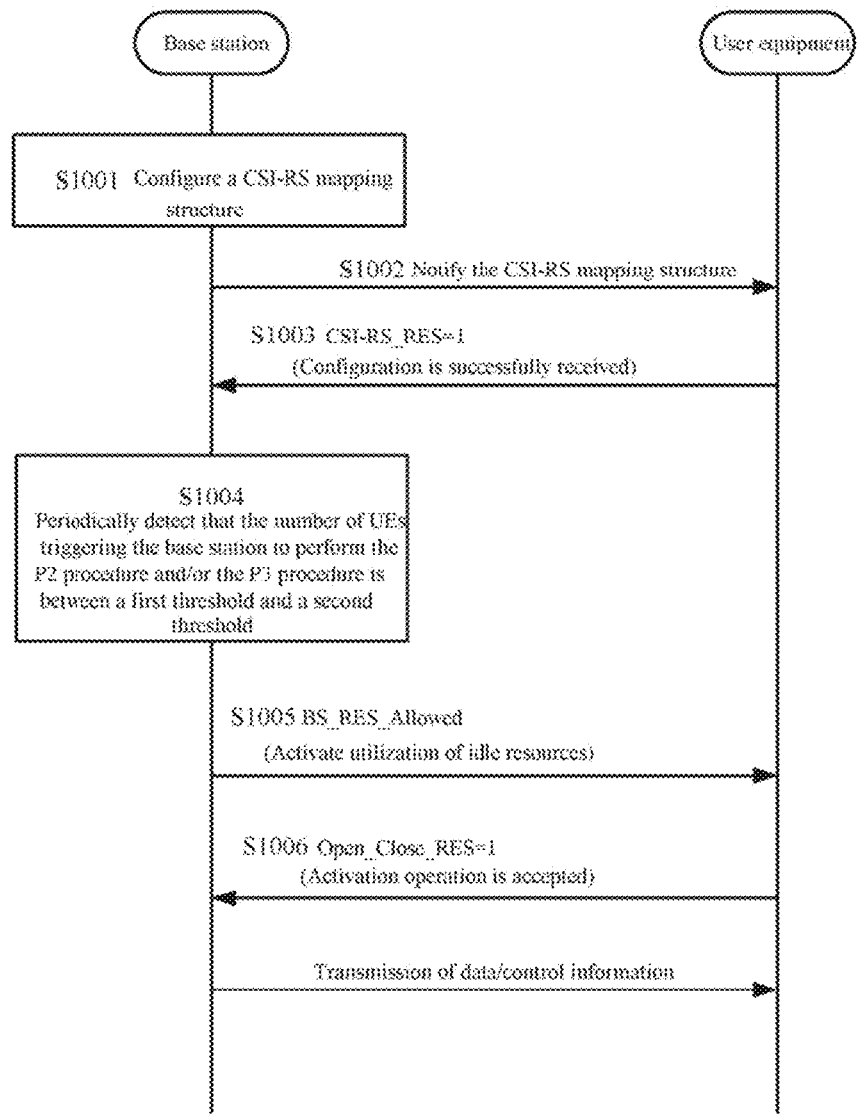
FIGS. 10A to 10C are flow charts illustrating signaling interaction processes for implementing the technology according to the present disclosure.

FIG. 10A is a flow chart illustrating an example of a signaling interaction process for implementing the technology according to the present disclosure.

As shown in FIG. 10A, the base station first configures, for each user equipment, a CSI-RS mapping structure according to the number of to-be-swept transmission beams/reception beams and an SF in step S1001, and notifies the configured CSI-RS mapping structure to the user equipment in step S1002. One can refer to the description in the foregoing embodiments for the specific notification manner, which is not repeated here. If the user equipment successfully receives the CSI-RS mapping structure, the user equipment may feed CSI-RS_RES=1 back to the base station in step S1003. Otherwise, the user equipment may feed CSI-RS_RES=0 back to the base station to indicate that the reception operation fails.

Next, in a case that user equipment successfully receives the CSI-RS mapping structure, in step S1004, the base station may, for example, periodically detect the number of user equipment triggering the base station to perform the P2 procedure and/or the P3 procedure. In a case that the number is between the first threshold and the second threshold, in step S1005, the base station transmits BS_RES_Allowed to the user equipment to notify the user equipment that utilization of idle resource elements is to be activated for transmitting data and/or control elements in the P2 procedure and/or the P3 procedure. Next, on reception of the notification of activating utilization of the idle resource elements, in step S1006, the user equipment returns Open-_Close_RES=1 to the base station if the user equipment determines to approve the activation operation according to its own situation. On reception of this positive feedback, the base station transmits data and/or control information by utilizing the idle resource elements, and the user receives the data and/or control information on corresponding time-frequency resources. On the other hand, if the user equipment returns Open_Close_RES=0, which indicates that the user equipment refuses the activation operation, the base station terminates the subsequent transmission of data and/or control information.

Figure 10B:
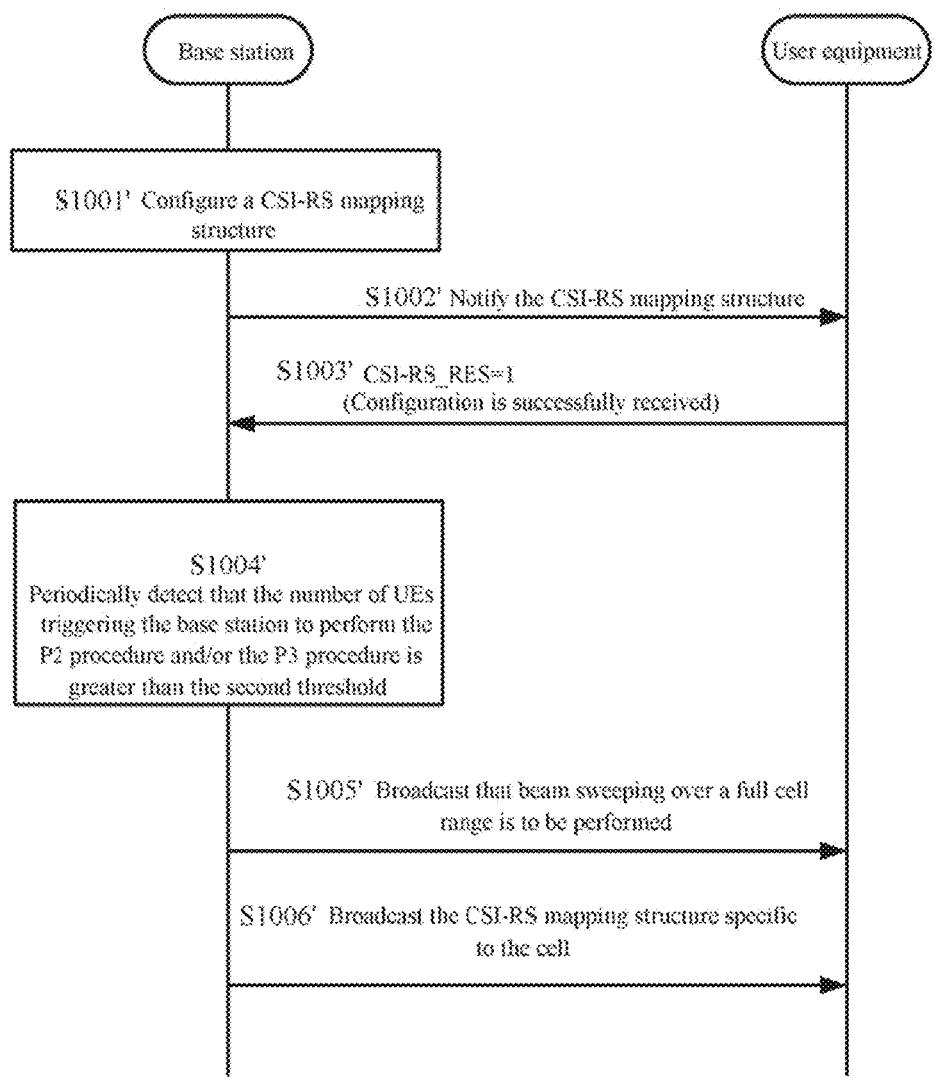

FIG. 10B is a flow chart illustrating another example of a signaling interaction process for implementing the technology according to the present disclosure.

The signaling interaction process shown in FIG. 10B is similar to the signaling interaction process shown in FIG. 10A, except that in step S1004', the base station determines that the number of user equipment triggering the base station to perform the P2 procedure and/or the P3 procedure is greater than the second threshold, so that in step S1005', the base station broadcasts to all user equipment within a cell range that a beam sweeping procedure is to be performed over the full cell range, and in step S1006', the base station broadcasts the CSI-RS mapping structure specific to the cell to all user equipment within the cell.

Figure 10C:
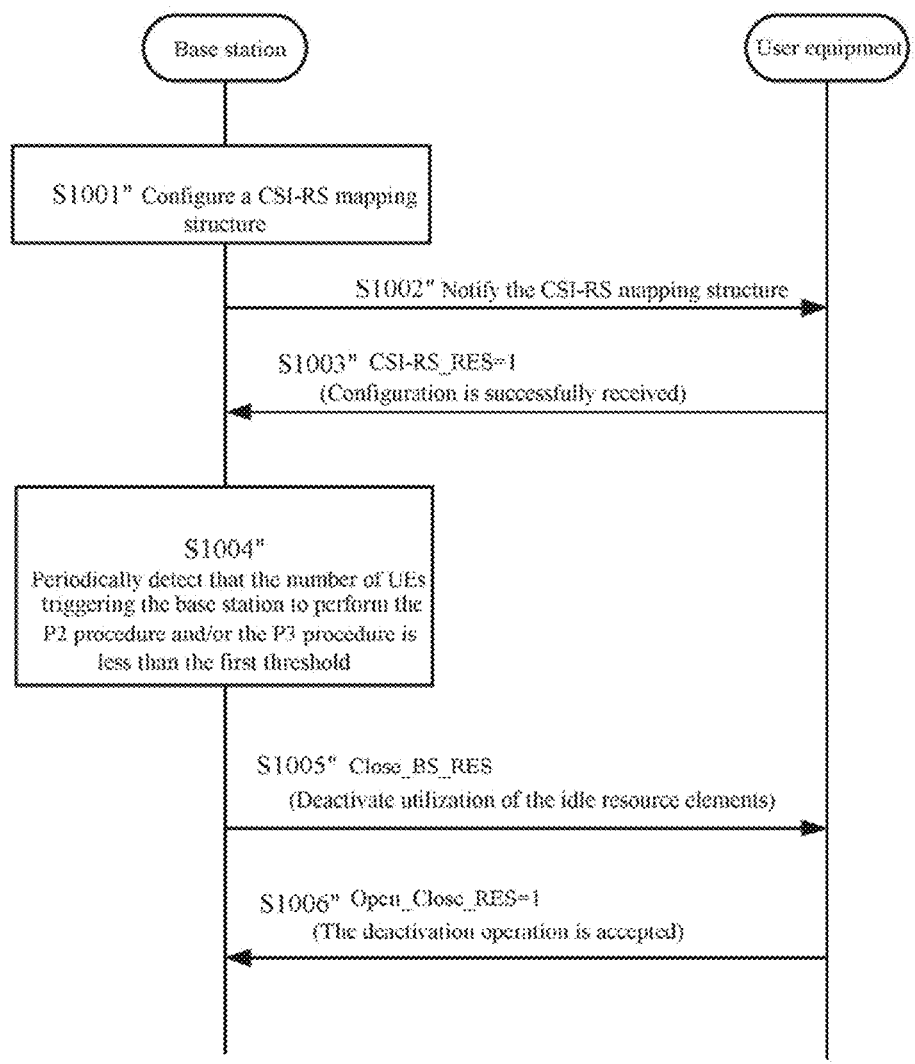

FIG. 10C is a flow chart illustrating another example of a signaling interaction process for implementing the technology according to the present disclosure.

The signaling interaction process shown in FIG. 10C is similar to the signaling interaction process shown in FIG. 10A, except that in step S1004", the base station determines that the number of user equipment triggering the base station to perform the P2 procedure and/or the P3 procedure is less than the first threshold, so that in step S1005", the base station transmits Close_BS_RES to the user equipment to notify the user equipment that the utilization of the idle resource elements is to be deactivated. Next, on reception of the notification of deactivating the utilization of the idle resources, in step S1006", the user equipment returns Open_Close_RES=1 to the base station if the deactivation operation from the base station is successfully received, so that the base station and the user equipment may subsequently perform the P2 procedure and/or the P3 procedure in the conventional manner. On the other hand, if the user equipment returns Open_Close_RES=0, it is indicated that the user fails to receive the deactivation operation.

It should be noted that the signaling interaction flows shown in FIGS. 10A to 10C are only examples for explaining the principle of the present disclosure, and those skilled in the art can appropriately modify these signaling interaction flows according to the principles of the present disclosure, and all such modifications are considered to fall within the scope of the present disclosure. In addition, it should be noted that although the steps are numbered in time series for convenience of description in FIGS. 10A to 10C, these numbers do not indicate the order in which the steps are performed. In fact, these steps can be performed in parallel, or the steps can be exchanged with each other in the order, and so on.

Corresponding to the above device embodiments, method embodiments according to the present disclosure will be described below with reference to FIGS. 11 and 12.

Figure 11:
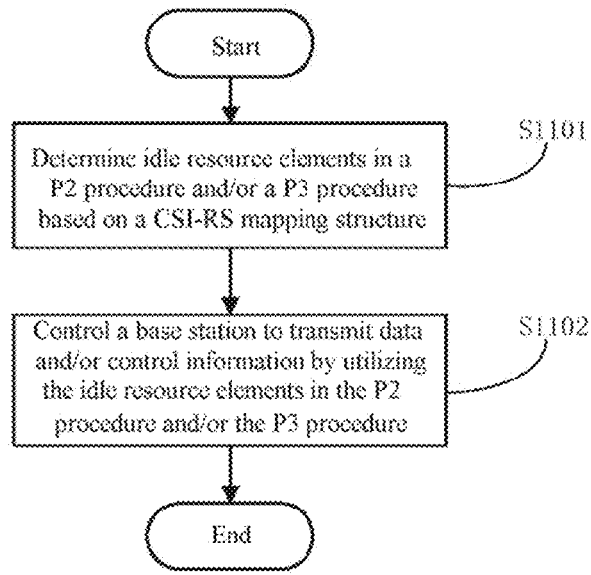
FIG. 11 is a flow chart illustrating a process example of a method in a wireless communication system according to an embodiment of the present disclosure.

FIG. 11 is a flow chart illustrating a process example of a method in a wireless communication system according to an embodiment of the present disclosure. The method may be performed on a base station side.

As shown in FIG. 11, the method according to this embodiment starts from step S1101. In step S1101, idle resource elements in a P2 procedure and/or a P3 procedure are determined based on a channel state information-reference signal (CSI-RS) mapping structure. Only transmission beam sweeping is performed in the P2 procedure, only reception beam sweeping is performed in the P3 procedure, and the idle resource elements are resource elements which are not occupied by CSI-RS in an OFDM symbol occupied by CSI-RS.

Then, the method proceeds to step S1102. In step S1102, when the P2 procedure and/or the P3 procedure is performed, a base station is controlled to transmit data and/or control information to user equipment by utilizing the idle resource elements.

Preferably, the method may further include: determining, according to number of user equipment triggering the base station to perform the P2 procedure and/or the P3 procedure, whether to activate utilization of the idle resource elements in the P2 procedure and/or the P3 procedure, and notifying a determination result to each user equipment. If the number is less than a first threshold, it is determined to deactivate utilization of the idle resource elements. If the number is greater than a second threshold, it is determined to perform a beam sweeping procedure over a full cell range. If the number is between the first threshold and the second threshold, it is determined to activate utilization of the idle resource elements. In a case that it is determined to perform the beam sweeping procedure over a full cell range, the method may further include: configuring a CSI-RS mapping structure for all user equipment within a cell range corresponding to the base station.

Preferably, the method may further include: controlling the base station to utilize all idle resource elements in a same subcarrier to transmit same data and/or control information.

Preferably, the method may further include: controlling the base station to transmit, in idle resource elements of an OFDM symbol occupied by CSI-RS, data and/or control information by utilizing a transmission beam which is the same as a transmission beam for transmitting the CSI-RS occupying the OFDM symbol.

Preferably, the method may further include: controlling, when the P2 procedure is performed, the base station to transmit CSI-RS in a manner that one OFDM symbol used for beam sweeping corresponds to one to-be-swept transmission beam, according to the CSI-RS mapping structure.

Preferably, the method may further include: controlling, when the P2 procedure is performed, the base station to transmit CSI-RS in a manner that all OFDM symbols used for beam sweeping correspond to a same transmission beam, according to the CSI-RS mapping structure.

Preferably, the method may further include: configuring, for each user equipment, the CSI-RS mapping structure based on at least the number of to-be-swept transmission beams and/or reception beams and a sub-sampling factor, and notifying the CSI-RS mapping structure to the user equipment.

Preferably, the method may further include: configuring, for each user equipment, the CSI-RS mapping structure in a manner that OFDM symbols included in one resource block are respectively occupied by CSI-RS for beam sweeping and CSI-RS for channel state information (CSI) feedback.

Preferably, the method may further include: determining, for each user equipment, OFDM symbols occupied by the CSI-RS for beam sweeping in one resource block based on the number of the to-be-swept transmission beams and/or reception beams, and determining OFDM symbols occupied by the CSI-RS for CSI feedback in the resource block based on the OFDM symbols occupied by the CSI-RS for beam sweeping, thus configuring the CSI-RS mapping structure.

Preferably, the method may further include: configure, for each user equipment, the CSI-RS mapping structure in a manner that, in one resource block, the OFDM symbols occupied by the CSI-RS for beam sweeping are arranged before the OFDM symbols occupied by the CSI-RS for CSI feedback.

Preferably, the method may further include: representing the CSI-RS mapping structure in a form of a bitmap.

Preferably, the method may further include: generating the bitmap in a manner that each sub-carrier in one resource block corresponds to one bit sequence, wherein in each sub-carrier, a resource element occupied by the CSI-RS is represented as 1 and a resource element not occupied by the CSI-RS is represented as 0.

Preferably, the method may further include: controlling the base station to transmit at least bit sequences corresponding to two sub-carriers, a bit sequence indicating a sub-sampling factor, and a bit sequence indicating the number of OFDM symbols occupied by the CSI-RS for beam sweeping, so as to notify the CSI-RS mapping structure to the user equipment. The sub-sampling factor includes a sub-sampling factor used for beam sweeping and a sub-sampling factor used for CSI feedback.

Preferably, in the CSI-RS mapping structure, resource elements occupied by the CSI-RS correspond to same or different antenna ports, and OFDM symbols occupied by the CSI-RS are continuous or discontinuous.

It should be noted that the method embodiment described here corresponds to the embodiments of the devices 200, 300 and 700 described above with reference to FIGS. 1 to 8. Thus, for the contents which are not described in detail here, reference can be made to the above description at the corresponding positions, which is not repeated here.

Figure 12:
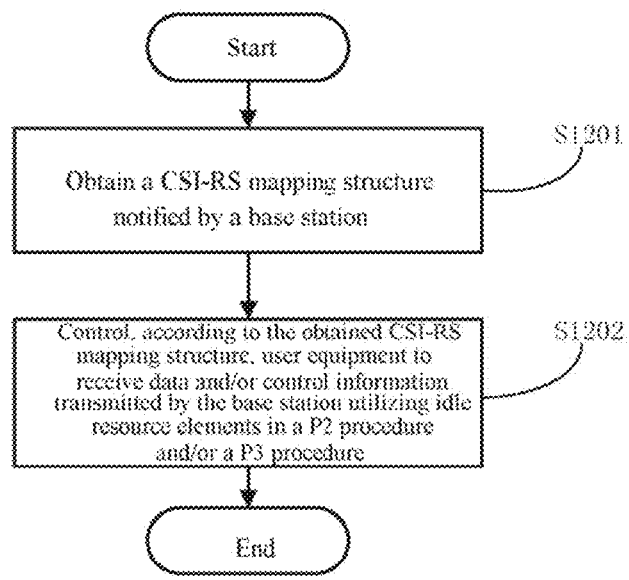
FIG. 12 is a flow chart illustrating a process example of a method in a wireless communication system according to an embodiment of the present disclosure.

FIG. 12 is a flow chart illustrating a process example of a method in a wireless communication system according to an embodiment of the present disclosure. The method may be performed on a user equipment side.

As shown in FIG. 12, the method starts from step S1201. In step S1201, a CSI-RS mapping structure notified by a base station is obtained. Then, the method proceeds to step S1202. In step S1202, user equipment is controlled, according to the obtained CSI-RS mapping structure, to receive data and/or control information transmitted by the base station utilizing idle resource elements in performing a. P2 procedure and/or a P3 procedure.

Preferably, the method may further include: controlling, according to a determination result from the base station regarding whether to activate utilization of the idle resource elements in the P2 procedure and/or the P3 procedure, the user equipment to receive the data and/or control information transmitted by the base station utilizing the idle resource elements.

Preferably, the method may further include: controlling, when the P2 procedure is performed, the user equipment to utilize a same reception beam to receive CSI-RS, data and/or control information transmitted by the base station utilizing different to-be-swept transmission beams.

Preferably, the method may further include: controlling, when the P3 procedure is performed, the user equipment to utilize different to-be-swept reception beams to receive CSI-RS, data and/or control information transmitted by the base station utilizing a same transmission beam.

It should be noted that the method embodiment described here corresponds to the embodiment of the device 900 described above with reference to FIG. 9. Thus, for the contents which are not described in detail here, reference can be made to the above description at the corresponding positions, which is not repeated here.

It should be noted that although the examples of the processes of the methods in the wireless communication system according to the embodiments of the present disclosure have been described, these are only examples rather than limitations. Those skilled in the art may modify the above embodiments according to the principle in the present disclosure. For example, the steps in the embodiments may be added, deleted and/or combined, or the like, and all of such modifications fall within the scope of the present disclosure.

It should be understood that, machine-executable instructions in a storage medium and a program product according to the embodiments of the present disclosure may further be configured to perform the method corresponding to the above-described device embodiment. Therefore, for the contents not described in detail here, reference may be made to the previous corresponding description, which is not repeated here.

Accordingly, a storage medium on which the above program product storing machine-executable instructions is carried is also included in the present disclosure. The storage medium includes but is not limited to a floppy disk, an optical disk, a magneto-optical disk, a storage card, a memory rod and the like.

Figure 13:
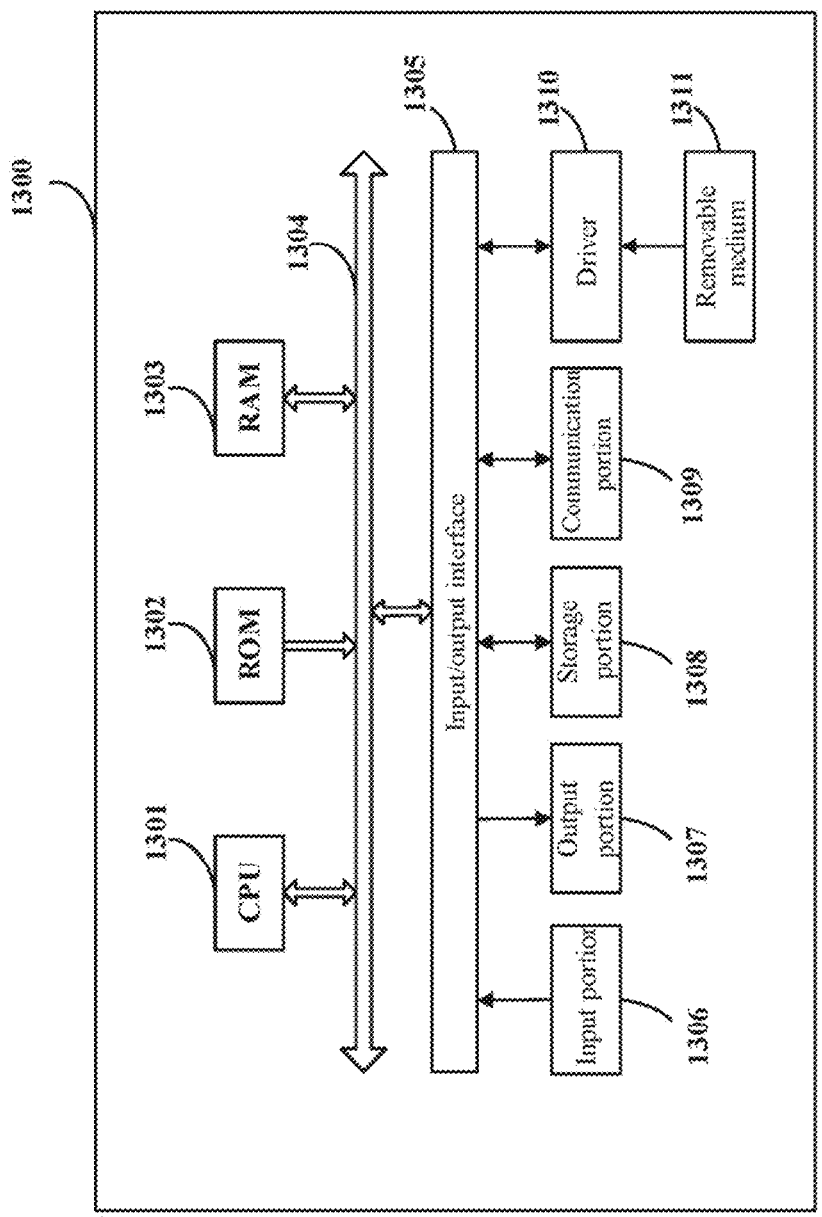
FIG. 13 is a block diagram illustrating an exemplary structure of a personal computer which can be used as an information processing device according to an embodiment of the present disclosure.

Furthermore, it should be noted that the foregoing series of processes and devices can also be embodied in software and/or firmware. In the case of being implemented in software and/or firmware, a program constituting the software is installed from a storage medium or a network to a computer with a dedicated hardware structure, e.g., a general purpose personal computer 1300 illustrated in FIG. 13, which can perform various functions when various programs are installed thereon. FIG. 13 is a block diagram illustrating an exemplary structure of a personal computer which can be used as an information processing device according to an embodiment of the present disclosure.

In FIG. 13, a central processing unit (CPU) 1301 performs various processing based on programs stored in a read only memory (ROM) 1302 or programs loaded to a random access memory (RAM) 1303 from a storage portion 1308. In the RAM 1303, data required when the CPU 1301 performs various processing is stored as needed.

The CPU 1301, the ROM 1302 and the RAM 1303 are connected to each other via a bus 1304. An input/output interface 1305 is also connected to the bus 1304.

The following components are connected to the input/output interface 1305: an input portion 1306 including a keyboard, a mouse and the like, an output portion 1307 including a display such as a Cathode Ray Tube (CRT) and a Liquid Crystal Display (LCD), a loudspeaker and the like, a storage portion 1308 including a hard disk and the like, and a communication portion 1309 including a network interface card such as a LAN card, a modem and the like. The communication portion 1309 performs communication processing via a network such as the Internet.

If necessary, a driver 1310 can also be connected to the input/output interface 1305. A removable medium 1311 such as a magnetic disk, an optical disk, a magneto-optical disk, a semiconductor memory and the like is mounted on the driver 1310 as necessary such that a computer program read out therefrom is installed in the storage portion 1308 as required.

In a case that the series of processing above is implemented by software, a program constituting the software is installed from the network such as the Internet or the storage medium such as the removable medium 1311.

It is understood by those skilled in the art that the storage medium is not limited to the removable medium 1311 shown in FIG. 13 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage portion 1308 or the like. Herein, the program is stored in the storage medium, and the storage medium is distributed to the user together with the device containing the storage medium.

The technology in the present disclosure can be applied to various products. For example, the base station mentioned in the present disclosure may be implemented as any type of evolved node B (eNB) such as a macro eNB and a small eNB. The small eNB may be an eNB covering a cell smaller than a macro cell, such as a pico eNB, a micro eNB and a home (femto) eNB. Alternatively, the base station may be implemented as any other type of base station, such as the Node B and a base transceiver station (BTS). The base station may include: a body configured to control wireless communication (also referred to as a base station device); and one or more remote radio heads (RRHs) arranged at a position different from the position of the body. In addition, the various types of terminals described in the following may operate as a base station by performing the base station function temporarily or in a semi-persistence manner.

For example, the user equipment mentioned in the present disclosure may be implemented as a mobile terminal (such as a smartphone, a tablet personal computer (PC), a notebook type PC, a portable game terminal, a portable/dongle mobile router and a digital camera) or a vehicle-mounted terminal (such as an automobile navigation device). The UE may also be implemented as a terminal (that is also referred to as a machine type communication (MTC) terminal) that performs machine-to-machine (M2M) communication. Furthermore, the UE may be a radio communication module (such as an integrated circuit module including a single die) mounted on each of the terminals.

Application examples according to the present disclosure are described below with reference to FIGS. 14 to 17.

APPLICATION EXAMPLE ON BASE STATION

First Application Example

Figure 14:
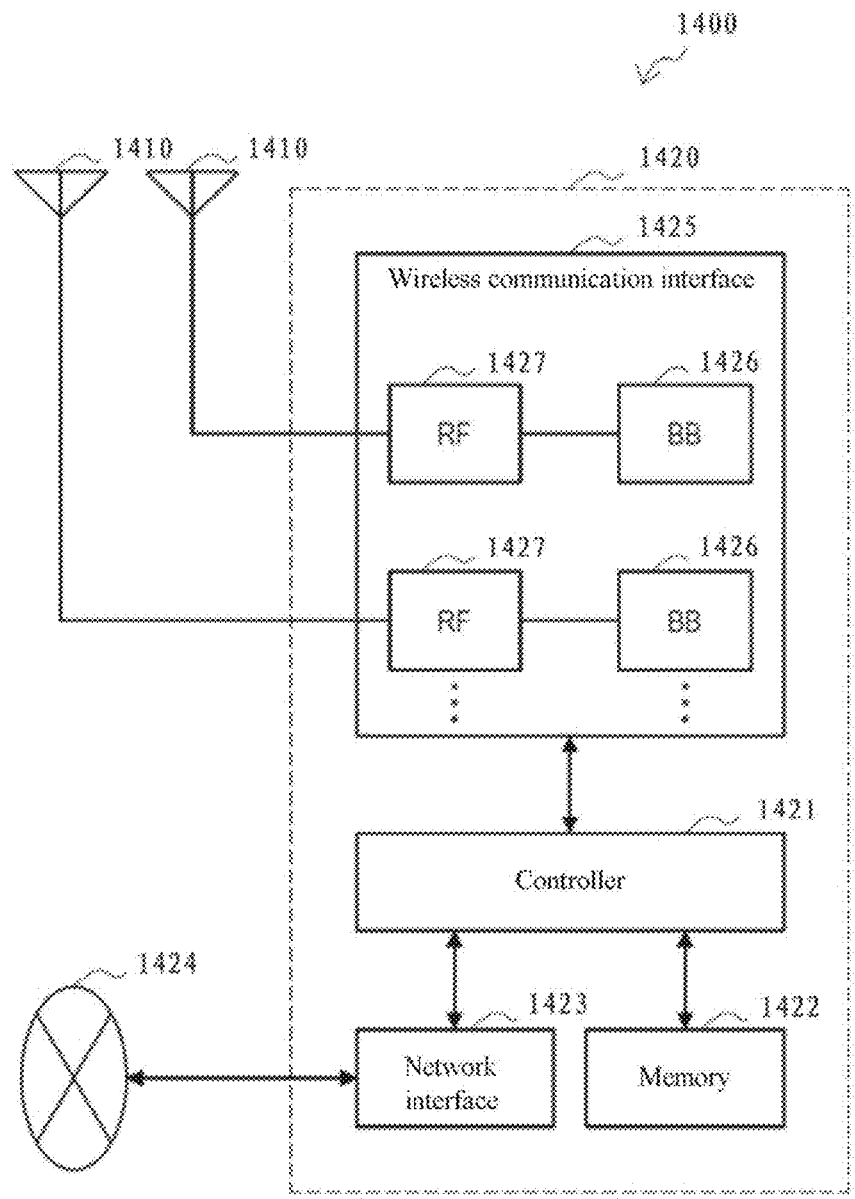
FIG. 14 is a block diagram illustrating a first example of a schematic configuration of an evolved node (eNB) to which the technology of the present disclosure may be applied.

FIG. 14 is a block diagram illustrating a first example of a schematic configuration of an eNB to which the technology of the present disclosure may be applied. An eNB 1400 includes one or more antennas 1410 and a base station device 1420. The base station device 1420 may be connected to each of the antennas 1410 via a RF cable.

Each of the antennas 1410 includes one or more antenna elements (such as multiple antenna elements included in a multiple-input multiple-output (MIMO) antenna), and is for the base station device 1420 to transmit and receive a wireless signal. As shown in FIG. 14, the eNB 1400 may include multiple antennas 1410. For example, the multiple antennas 1410 may be compatible with multiple frequency bands used by the eNB 1400. Although FIG. 14 shows the example in which the eNB 1400 includes multiple antennas 1410, the eNB 1400 may include a single antenna 1410.

The base station device 1420 includes a controller 1421, a memory 1422, a network interface 1423 and a radio communication interface 1425.

The controller 1421 may be for example a CPU or a DSP, and operates various functions of a high layer of the base station device 1420. For example, the controller 1421 generates a data package based on data of a signal processed by the radio communication interface 1425, and transfers the generated package via the network interface 1423. The controller 1421 may bundle data from multiple baseband processors to generate a bundling package, and transfers the generated bundling package. The controller 1421 may have a logical function for performing the following controls: radio resource control, radio bearer control, mobility management, admission control and scheduling. The control may be performed in conjunction with a nearby eNB or core network node. The memory 1422 includes RAM and ROM, and stores programs to be executed by the controller 1421 and various types of control data (such as a terminal list, transmission power data and scheduling data).

The network interface 1423 is a communication interface for connecting the base station device 1420 to a core network 1424. The controller 1421 may communicate with a core network node or another eNB via the network interface 1423. In this case, the eNB 1400 may be connected with the core network node or other eNBs via a logic interface (such as an interface S1 and an interface X2). The network interface 1423 may be a wired communication interface or a radio communication interface for wireless backhaul routing. If the network interface 1423 is a radio communication interface, the network interface 1423 may use a frequency band for wireless communication higher than that used by the radio communication interface 1425.

The radio communication interface 1425 supports any cellular communication scheme (such as Long Term Evolution (LTE) and LTE-advanced), and provides a wireless connection to a terminal located in a cell of the eNB 1400 via the antenna 1410. The radio communication interface 1425 may generally include for example a baseband (BB) processor 1426 and an RF circuit 1427, The BB processor 1426 may perform for example coding/decoding, modulation/demodulation and multiplexing/demultiplexing, and performs various types of signal processing of layers (such as L1, Media Access Control (MAC), Radio Link Control (RLC) and Packet Data Convergence Protocol (PDCP)). Instead of the controller 1421, the 1313 processor 1426 may have a portion or all of the above logical functions. The BB processor 1426 may be a memory storing communication control programs, or a module including a processor and a related circuit which are configured to execute programs. The function of the BB processor 1426 may be changed when the programs are updated. The module may be a card or blade inserted into the slot of the base station device 1420. Alternatively, the module may be a chip mounted on the card or the blade. Meanwhile, the RF circuit 1427 may include for example a frequency mixer, a filter and an amplifier, and transmit and receive a wireless signal via the antenna 1410.

As shown in FIG. 14, the radio communication interface 1425 may include multiple BB processors 1426. For example, the multiple BB processors 1426 may be compatible with the multiple frequency bands used by the eNB 1400. As shown in FIG. 14, the radio communication interface 1425 may include multiple RF circuits 1427. For example, the multiple RF circuits 1427 may be compatible with multiple antenna elements. Although FIG. 14 shows an example in which the radio communication interface 1425 includes multiple BB processors 1426 and multiple RF circuits 1427, the radio communication interface 1425 may include a single BB processor 1426 or a single RF circuit 1427.

Second Application Example

Figure 15:
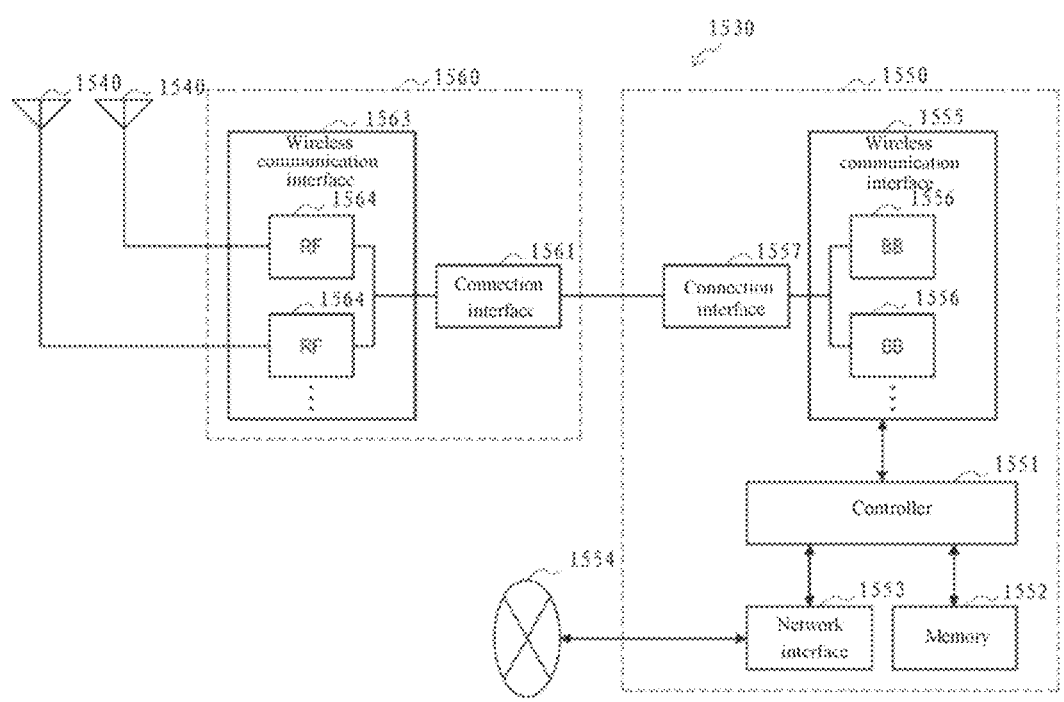
FIG. 15 is a block diagram illustrating a second example of a schematic configuration of an eNB to which the technology of the present disclosure may be applied.

FIG. 15 is a block diagram illustrating a second example of a schematic configuration of an eNB to which the technology of the present disclosure may be applied. An eNB 1530 includes one or more antennas 1540, a base station device 1550 and an RRH 1560. The RRH 1560 and each antenna 1540 may be connected to each other via an RF cable. The base station device 1550 and the RRH 1560 may be connected to each other via a high speed line such as an optical fiber cable.

Each of the antennas 1540 includes a single or multiple antenna elements (such as multiple antenna elements included in the MIMO antenna) and is used for the RRH 1560 to transmit and receive a wireless signal. As shown in FIG. 15, the eNB 1530 may include multiple antennas 1540. For example, the multiple antennas 1540 may be compatible with multiple frequency bands used by the eNB 1530. Although FIG. 15 shows an example in which the eNB 1530 includes multiple antennas 1540, the eNB 1530 may include a single antenna 1540.

The base station device 1550 includes a controller 1551, a memory 1552, a network interface 1553, a wireless communication interface 1555 and a connection interface 1557. The controller 1551, the memory 1552 and the network interface 1553 are the same as the controller 1421, the memory 1422 and the network interface 1423 described with reference to FIG. 14.

A wireless communication interface 1555 supports any cellular communication scheme (such as LTE and LTE-advanced), and provide wireless communication with a terminal in a sector corresponding to the RRH 1560 via the RRH 1560 and the antenna 1540. The wireless communication interface 1555 may generally include a BB processor 1556 for example. Except that the BB processor 1556 is connected to an RF circuit 1564 of the RRH 1560 via the connection interface 1557, the BB processor 1556 is the same as the BB processor 1426 described with reference to FIG. 14. As shown in FIG. 15, the wireless communication interface 1555 may include multiple BB processors 1556. For example, the multiple BB processors 1556 may be compatible with multiple frequency bands used by the eNB 1530. Although FIG. 15 shows an example in which the wireless communication interface 1555 includes multiple BB processors 1556, the wireless communication interface 1555 may include a single BB processor 1556.

The connection interface 1557 is an interface configured to connect the base station device 1550 (the wireless communication interface 1555) to the RRH 1560. The connection interface 1557 may be a communication module for communication in the high speed line described above which connects the base station device 1550 (the wireless communication interface 1555) to the RRH 1560.

The RRH 1560 includes a connection interface 1561 and a wireless communication interface 1563.

The connection interface 1561 is an interface configured to connect the RRH 1560 (the wireless communication interface 1563) to the base station device 1550. The connection interface 1561 may be a communication module for performing communication via the high speed line described above.

The wireless communication interface 1563 transmits and receives a wireless signal via the antenna 1540. The wireless communication interface 1563 may generally include an RF circuit 1564 for example. The RF circuit 1564 may include for example a mixer, a filter and an amplifier, and transmits and receives a wireless signal via the antenna 1540. As shown in FIG. 15, the wireless communication interface 1563 may include multiple RF circuits 1564. For example, the multiple RF circuits 1564 may support multiple antenna elements. Although FIG. 15 shows an example in which the wireless communication interface 1563 includes multiple RF circuits 1564, the wireless communication interface 1563 may include a single RF circuit 1564.

In the eNB 1400 and eNB 1530 shown in FIG. 14 and FIG. 15, the communication unit in the devices 200, 200 and 700 described with reference to FIGS. 2, 3 and 7 may be implemented by the wireless communication interface 1425 and the wireless communication interface 1555 and/or the wireless communication interface 1563. At least a part of the function of the idle resource element determination unit, the control unit, the configuration unit and the determination unit in the devices 200, 300 and 700 described with reference to FIGS. 2, 3 and 7 may be implemented by the controller 1421 and the controller 1551.

APPLICATION EXAMPLE OF USER EQUIPMENT

First Application Example

Figure 16:
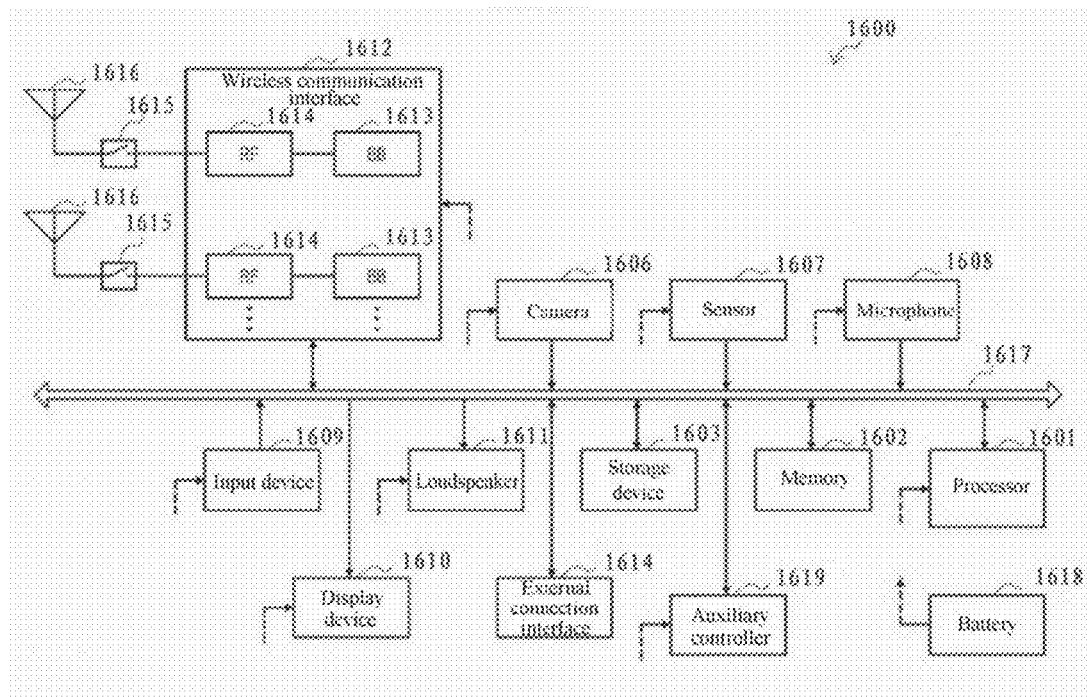
FIG. 16 is a block diagram illustrating an example of a schematic configuration of a smart phone to which the technology of the present disclosure may be applied.

FIG. 16 is a block diagram illustrating an example of a schematic configuration of a smart phone 1600 to which the technology of the present disclosure may be applied. The smart phone 1600 includes: a processor 1601, a memory 1602, a storage device 1603, an external connection interface 1604, a camera 1606, a sensor 1607, a microphone 1608, an input device 1609, a display device 1610, a loudspeaker 1611, a wireless communication interface 1612, one or more antenna switches 1615, one or more antennas 1616, a bus 1617, a battery 1618 and an auxiliary controller 1619.

The processor 1601 may be for example a CPU or a system on chip (SoC), and control functions of an application layer and other layers of the smart phone 1600. The memory 1602 includes an RAM and an ROM, and stores programs executed by the processor 1601 and data. The storage device 1603 may include a storage medium, such as a semiconductor memory and a hard disk. The external connection interface 1604 is an interface configured to connect an external device (such as a memory card and a universal serial bus (USB) device) to the smart phone 1600.

The camera 1606 includes an image sensor (such as a charge coupled device (CCD) and a complementary metal oxide semiconductor (CMOS)) and generates a captured image. The sensor 1607 may include a set of sensors, such as a measurement sensor, a gyroscope sensor, a geomagnetic sensor and an acceleration sensor. The microphone 1608 converts sound inputted into the smart phone 1600 into an audio signal. The input device 1609 includes for example a touch sensor configured to detect touch on a screen of the display device 1610, a keypad, a keyboard, a button or a switch, and receives an operation or information inputted from a user. The display device 1610 includes a screen (such as a liquid crystal display (LCD) and an organic light emitting diode (OLED) display), and displays an output image of the smart phone 1600. The loudspeaker 1611 converts the audio signal outputted from the smart phone 1600 into sound.

The wireless communication interface 1612 supports any cellular communication scheme (such as LTE and LTE-advanced), and performs wireless communication. The wireless communication interface 1612 may generally include for example a BB processor 1613 and an RF circuit 1614. The BB processor 1613 may perform encoding/decoding, modulating/demodulating and multiplexing/de-multiplexing for example, and perform various types of signal processing for wireless communication. Meanwhile, the RF circuit 1614 may include for example a mixer, a filter and an amplifier, and transmits and receives a wireless signal via an antenna 1616. The wireless communication interface 1612 may be a chip module on which a BB processor 1613 and the RF circuit 1614 are integrated. As shown in FIG. 16, the wireless communication interface 1612 may include multiple BB processors 1613 and multiple RF circuits 1614. Although FIG. 16 shows an example in which the wireless communication interface 1612 includes multiple BB processors 1613 and multiple RF circuits 1614, the wireless communication interface 1612 may include a single 1313 processor 1613 or a single RF circuit 1614.

In addition to the cellular communication scheme, the wireless communication interface 1612 may support other types of wireless communication schemes, such as a short distance wireless communication scheme, a near field communication scheme and a wireless local area network (LAN) scheme. In this case, the wireless communication interface 1612 may include a BB processor 1613 and an RF circuit 1614 for each type of wireless communication scheme.

Each of the wireless switches 1615 switches a connection destination of the antenna 1616 between multiple circuits (for example circuits for different wireless communication schemes) included in the wireless communication interface 1612.

Each of the antennas 1616 includes a single or multiple antenna elements (such as multiple antenna elements included in the MIMO antenna), and is used for the wireless communication interface 1612 to transmit and receive a wireless signal. As shown in FIG. 16, the smart phone 1600 may include multiple antennas 1616. Although FIG. 16 shows an example in which the smart phone 1600 includes multiple antennas 1616, the smart phone 1600 may include a single antenna 1616.

In addition, the smart phone 1600 may include an antenna 1616 for each type of wireless communication scheme. In this case, the antenna switch 1615 may be omitted from the configuration of the smart phone 1600.

The bus 1617 connects the processor 1601, the memory 1602, the storage device 1603, the external connection interface 1604, the camera 1606, the sensor 1607, the microphone 1608, the input device 1609, the display device 1610, the loudspeaker 1611, the wireless communication interface 1612 and the auxiliary controller 1619 with each other. The battery 1618 supplies power for blocks in the smart phone 1600 shown in FIG. 16 via a feeder which is indicated partially as a dashed line in the figure. The auxiliary controller 1619 controls a minimum necessary function of the smart phone 1600 in a sleeping mode, for example.

In the smart phone 1600 shown in FIG. 16, the communication unit in the device 900 described with reference to FIG. 9 may be implemented by the wireless communication interface 1612. At least a part of the function of the obtaining unit and the control unit in the device 900 described with reference to FIG. 9 may be implemented by the processor 1601 or the auxiliary controller 1619.

Second Application Example

Figure 17:
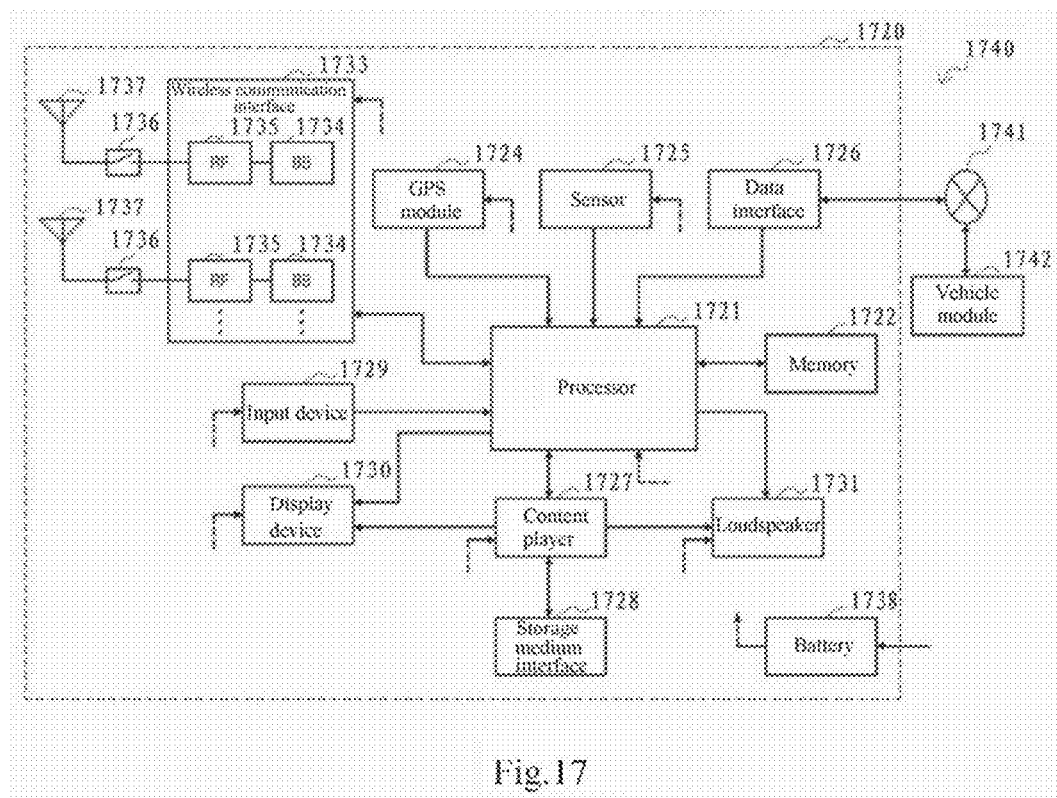
FIG. 17 is a block diagram illustrating an example of a schematic configuration of a vehicle navigation device to which the technology of the present disclosure may be applied.

FIG. 17 is a block diagram illustrating an example of a schematic configuration of a vehicle navigation device 1720 to which the technology of the present disclosure may be applied. The vehicle navigation device 1720 includes a processor 1721, a memory 1722, a global positioning system (GPS) module 1724, a sensor 1725, a data interface 1726, a content player 1727, a storage medium interface 1728, an input device 1729, a display device 1730, a loudspeaker 1731, a wireless communication interface 1733, one or more antenna switches 1736, one or more antennas 1737 and a battery 1738.

The processor 1721 may be a CPU or an SoC, and controls a navigation function and other functions of the vehicle navigation device 1720. The memory 1722 includes an RAM and an ROM, and stores programs executed by the processor 1721 and data.

The GPS module 1724 measures a position of the vehicle navigation device 1720 (such as a latitude, a longitude and a height) by using a GPS signal received from a GPS satellite. The sensor 1725 may include a set of sensors, such as a gyroscope sensor, a geomagnetic sensor and an air pressure sensor. The data interface 1726 is connected to a vehicle network 1741 for example through a terminal not shown, and acquires data generated by the vehicle (such as vehicle speed data).

The content player 1727 reproduces contents stored in a storage medium (such as a CD and a DVD), and the storage medium is inserted into the storage medium interface 1728. The input device 1729 includes for example a touch sensor configured to detect touch on a screen of the display device 1730, a button or a switch, and receives an operation or information inputted from a user. The display device 1730 includes a screen of an LCD or OLED display for example, and displays an image with a navigation function or the reproduced content. The loudspeaker 1731 outputs a sound with a navigation function or the reproduced content.

The wireless communication interface 1733 supports any cellular communication scheme (such as LTE and LTE-advanced), and performs wireless communication. The wireless communication interface 1733 may generally include a BB processor 1734 and an RF circuit 1735 for example. The BB processor 1734 may perform encoding/decoding, modulating/demodulating and multiplexing/de-multiplexing, and perform various types of signal processing for wireless communication. Meanwhile, the RF circuit 1735 may include for example a mixer, a filter and an amplifier, and transmits and receives a wireless signal via the antenna 1737. The wireless communication interface 1733 may also be a chip module on which the BB processor 1734 and the RF circuit 1735 are integrated. As shown in FIG. 17, the wireless communication interface 1733 may include multiple BB processors 1734 and multiple RF circuits 1735. Although FIG. 17 shows an example in which the wireless communication interface 1733 includes multiple BB processors 1734 and multiple RF circuits 1735, the wireless communication interface 1733 may include a single BB processor 1734 or a single RF circuit 1735.

In addition to the cellular communication scheme, the wireless communication interface 1733 may support other types of wireless communication schemes, such as a short distance wireless communication scheme, a near field communication scheme and a wireless LAN scheme. In this case, for each type of wireless communication scheme, the wireless communication interface 1733 may include the BB processor 1734 and the RF circuit 1735.

Each of the antenna switches 1736 switches a connection destination of the antenna 1737 between multiple circuits (such as circuits for different wireless communication schemes) included in the wireless communication interface 1733.

Each of the antennas 1737 includes a single or multiple antenna elements (such as multiple antenna elements included in the MIMO antenna), and is used for the wireless communication interface 1733 to transmit and receive a wireless signal. As shown in FIG. 17, the vehicle navigation device 1720 may include multiple antennas 1737. Although FIG. 17 shows an example in which the vehicle navigation device 1720 includes multiple antennas 1737, the vehicle navigation device 1720 may include a single antenna 1737.

In addition, the vehicle navigation device 1720 may include the antenna 1737 for each type of wireless communication scheme. In this case, the antenna switch 1736 may be omitted from the configuration of the vehicle navigation device 1720.

The battery 1738 supplies power for blocks in the vehicle navigation device 1720 shown in FIG. 17 via a feeder which is indicated partially as a dashed line in the figure. The battery 1738 accumulates power provided by the vehicle.

In the automobile navigation device 1720 shown in FIG. 17, the communication unit in the device 900 described with reference to FIG. 9 may be implemented by the wireless communication interface 1733. At least a part of the function of the obtaining unit and the control unit in the device 900 described with reference to FIG. 9 may be implemented by the processor 1721.

The technology of the present disclosure may be implemented as a vehicle-mounted system (or a vehicle) 1740 including one or more of the vehicle navigation device 1720, the vehicle network 1741 and a vehicle module 1742. The vehicle module 1742 generates vehicle data (such as a vehicle speed, an engine speed and fault information), and outputs the generated data to the vehicle network 1741.

Preferred embodiments of the present disclosure have been described above with reference to the drawings, but the present disclosure is not limited to the above examples of course. Those skilled in the art can make various changes and modifications within the scope of the appended claims, and it should be understood that such changes and modifications naturally fall within the technical scope of the present disclosure.

For example, multiple functions of one unit in the above embodiment may be implemented by separate devices. Alternatively, multiple functions implemented by multiple units in the above embodiments may be implemented by separated devices respectively. Furthermore, one of the above functions may be implemented by multiple units. Needless to say, such configuration is included in the technical scope of the present disclosure.

In the specification, steps described in the flowchart include not only the processing performed chronologically, but also the processing performed in parallel or individually rather than chronologically. Further, even in the steps processed chronically, without saying, the order can be appropriately changed.

Although the present disclosure and its advantages have been described in detail, it should be understood that, various changes, substitutions and alterations can be made herein without departing from the spirit and scope of the disclosure as defined by the appended claims. Further, the term "include", "comprise" or any variant thereof in the embodiments of the present disclosure is intended to encompass nonexclusive inclusion, so that a process, a method, an article or a device including a series of elements includes not only those elements but also other elements which have been not listed definitely or an element(s) inherent to the process, the method, the article or the device. Without limiting more, the elements defined by the statement "comprising one . . . " do not exclude that there are other identical elements in the process, method, article, or device that includes said elements.

The invention claimed is:

1. A device in a wireless communication system, the device comprising processing circuitry configured to:
   determine, idle resource elements in a P2 procedure and/or a P3 procedure based on a channel state information-reference signal (CSI-RS) mapping structure,
   wherein only transmission beam sweeping is performed in the P2 procedure, only reception beam sweeping is performed in the P3 procedure, and the idle resource elements are resource elements which are not occupied by CSI-RS in OFDM symbols occupied by CSI-RS; and
   control, in performing the P2 procedure and/or the P3 procedure, a base station to utilize the idle resource elements to transmit data and/or control information to user equipment,
   wherein the processing circuitry is further configured to configure, for each user equipment, the CSI-RS mapping structure based on at least a number of to-be-swept transmission beams and/or reception beams and a sub-sampling factor, and notify the CSI-RS mapping structure to the user equipment.

2. The device according to claim 1, wherein the processing circuitry is further configured to:
   determine, according to the number of user equipment triggering the base station to perform the P2 procedure and/or the P3 procedure, whether to activate utilization of the idle resource elements in the P2 procedure and/or the P3 procedure and to notify a determination result to each user equipment; and
   control, for each user equipment, the base station to transmit data and/or control information to the user equipment by utilizing the idle resource elements, if it is determined to activate utilization of the idle resource elements.

3. The device according to claim 2, wherein the processing circuitry is further configured to:
   determine, if the number is below a first threshold, to deactivate utilization of the idle resource elements;
   determine, if the number is above a second threshold, to perform a beam sweeping procedure over a full cell range; or
   determine, if the number is between the first threshold and the second threshold, to activate utilization of the idle resource elements, the first threshold being smaller than the second threshold.

4. The device according to claim 3, wherein the processing circuitry is further configured to configure, if it is determined to perform a beam sweeping procedure over a full cell range, a CSI-RS mapping structure for all user equipment within a cell range corresponding to the base station.

5. The device according to claim 1, wherein the processing circuitry is further configured to control the base station to utilize all idle resource elements in the same sub-carrier to transmit the same data and/or control information.

6. The device according to claim 1, wherein the processing circuitry is further configured to control the base station to transmit, in all idle resource elements within one OFDM symbol occupied by CSI-RS, data and/or control information by utilizing a transmission beam which is the same as a transmission beam for transmitting the CSI-RS occupying the OFDM symbol.

7. The device according to claim 1, wherein the processing circuitry is further configured to control, in performing the P2 procedure, the base station to transmit CSI-RS in a manner that one OFDM symbol used for beam sweeping corresponds to one to-be-swept transmission beam, according to the CSI-RS mapping structure; or
   control, in performing the P3 procedure, the base station to transmit CSI-RS in a manner that all OFDM symbols used for beam sweeping correspond to the same transmission beam, according to the CSI-RS mapping structure.

8. The device according to claim 1, wherein the processing circuitry is further configured to configure, for each user equipment, the CSI-RS mapping structure in a manner that OFDM symbols included in one resource block are respectively occupied by CSI-RS used for beam sweeping and CSI-RS used for channel state information (CSI) feedback.

9. The device according to claim 8, wherein the processing circuitry is further configured to determine, for each user equipment, OFDM symbols occupied by CSI-RS used for beam sweeping in one resource block according to the number of the to-be-swept transmission breams and/or reception beams, and determine OFDM symbols occupied by CSI-RS used for CSI feedback in one resource block according to the OFDM symbols occupied by the CSI-RS used for beam sweeping, thereby configuring the CSI-RS mapping structure.

10. The device according to claim 8, wherein the processing circuitry is further configured to configure, for each user equipment, the CSI-RS mapping structure in a manner that OFDM symbols occupied by CSI-RS used for beam sweeping are arranged before OFDM symbols occupied by CSI-RS used for CSI feedback in one resource block.

11. The device according to claim 8, wherein the processing circuitry is further configured to represent the CSI-RS mapping structure in a form of a bitmap.

12. The device according to claim 11, wherein the processing circuitry is further configured to generate the bitmap in a manner that each sub-carrier in one resource block corresponds to one bit sequence, wherein in each sub-carrier, a resource element occupied by CSI-RS is represented as 1 and a resource element not occupied by CSI-RS is represented as 0.

13. The device according to claim 12, wherein the processing circuitry is further configured to control the base station to transmit at least bit sequences corresponding to two sub-carriers, a bit sequence indicating the sub-sampling factor, and a bit sequence indicating the number of OFDM symbols occupied by CSI-RS used for beam sweeping, so as to notify the CSI-RS mapping structure to the user equipment, the sub-sampling factor comprising a sub-sampling factor used for beam sweeping and a sub-sampling factor used for CSI feedback.

14. The device according to claim 1, wherein in the CSI-RS mapping structure, resource elements occupied by CSI-RS correspond to same or different antenna ports; or
in the CSI-RS mapping structure, OFDM symbols occupied by CSI-RS are continuous or discontinuous.

15. The device according to claim 1, wherein the device further operates as the base station and further comprises:
a communication unit configured to perform communication with an external apparatus.

16. A device in a wireless communication system, the device comprising processing circuitry configured to:
control, according to a channel state information-reference signal (CSI-RS) mapping structure notified by a base station, user equipment to receive data and/or control information transmitted by the base station utilizing idle resource elements in performing a P2 procedure and/or a P3 procedure,
wherein only transmission beam sweeping is performed in the P2 procedure, only reception beam sweeping is performed in the P3 procedure, and the idle resource elements are resource elements not occupied by CSI-RS in OFDM symbols occupied by CSI-RS, which are determined based on the CSI-RS mapping structure, and
wherein the notified CSI-RS mapping structure is based on at least a number of to-be-swept transmission beams and/or reception beams and a sub-sampling factor.

17. The device according to claim 16, wherein the processing circuitry is further configured to: control, according to further a determination result regarding whether to activate utilization of the idle resource elements in the P2 procedure and/or the P3 procedure from the base station, the user equipment to receive data and/or control information transmitted by the base station utilizing the idle resource elements in performing the P2 procedure and/or the P3 procedure;
control, in performing the P2 procedure, the user equipment to utilize the same reception beam to receive CSI-RS, data and/or control information transmitted by the base station utilizing different to-be-swept transmission beams; or
control, in performing the P3 procedure, the user equipment to utilize different to-be-swept reception beams to receive CSI-RS, data and/or control information transmitted by the base station utilizing the same transmission beam.

18. The device according to claim 16, wherein the device further operates as the user equipment and further comprises:
a communication unit configured to perform communication with an external apparatus.

19. A method in a wireless communication system, the method comprising:
controlling, according to a channel state information-reference signal (CSI-RS) mapping structure notified by a base station, user equipment to receive data and/or control information transmitted by the base station utilizing idle resource elements in performing a P2 procedure and/or a P3 procedure,
wherein only transmission beam sweeping is performed in the P2 procedure, only reception beam sweeping is performed in the P3 procedure, and the idle resource elements are resource elements not occupied by CSI-RS in OFDM symbols occupied by CSI-RS, which are determined based on the CSI-RS mapping structure, and
wherein the notified CSI-RS mapping structure is based on at least a number of to-be-swept transmission beams and/or reception beams and a sub-sampling factor.

* * * * *